US008379751B2

(12) United States Patent
Lin et al.

(10) Patent No.: US 8,379,751 B2
(45) Date of Patent: Feb. 19, 2013

(54) METHOD OF TRANSMITTING DATA TO A RECEIVER

(75) Inventors: Zhiwei Lin, Singapore (SG); Xiaoming Peng, Singapore (SG); Po Shin Francois Chin, Singapore (SG); Khiam Boon Png, Singapore (SG)

(73) Assignee: Agency for Science, Technology and Research, Singapore (SG)

( * ) Notice: Subject to any disclaimer, the term of this patent is extended or adjusted under 35 U.S.C. 154(b) by 338 days.

(21) Appl. No.: 12/679,258

(22) PCT Filed: Sep. 19, 2008

(86) PCT No.: PCT/SG2008/000355
§ 371 (c)(1),
(2), (4) Date: Sep. 22, 2010

(87) PCT Pub. No.: WO2009/038543
PCT Pub. Date: Mar. 26, 2009

(65) Prior Publication Data
US 2011/0044376 A1    Feb. 24, 2011

Related U.S. Application Data

(60) Provisional application No. 60/973,594, filed on Sep. 19, 2007.

(51) Int. Cl.
*H04B 7/02* (2006.01)
(52) U.S. Cl. ........................................... 375/267
(58) Field of Classification Search .................... 375/267
See application file for complete search history.

(56) References Cited

U.S. PATENT DOCUMENTS

| 2004/0048584 A1* | 3/2004 | Vaidyanathan et al. ....... 455/103 |
| 2005/0053169 A1* | 3/2005 | Jia et al. ......................... 375/267 |
| 2005/0163244 A1 | 7/2005 | Seto et al. |
| 2006/0034382 A1 | 2/2006 | Ozluturk et al. |
| 2007/0099584 A1* | 5/2007 | Niu et al. ....................... 455/101 |
| 2007/0133708 A1 | 6/2007 | Lee et al. |
| 2010/0316154 A1* | 12/2010 | Park et al. ..................... 375/267 |
| 2012/0039377 A1* | 2/2012 | Sun et al. ....................... 375/224 |
| 2012/0076238 A1 | 3/2012 | Catreux et al. |

FOREIGN PATENT DOCUMENTS

| CN | 1860693 A | 11/2006 |
| WO | 2005/125044 A1 | 12/2005 |

OTHER PUBLICATIONS

Yan Zheng, et al., "Performance Analysis of the MB-OFDM Ultra-Wide Band Communication System with Space-Time Block Coding and Antenna Selection," ICI 2007, 3rd IEEE/IFIP International Conference in Central Asia, Oct. 26, 2007, 5 pages.

Foerster, J., "Channel Modeling Sub-Committee Report Final," Feb. 2003, http://grouper.ieee.org/groups/802/15/pub/, 52 pages.

(Continued)

*Primary Examiner* — Don N Vo
(74) *Attorney, Agent, or Firm* — Fliesler Meyer LLP

(57) ABSTRACT

A method of transmitting data to a receiver, wherein the data is transmitted using a plurality of sub-carriers, is provided. The method provided includes determining, for each sub-carrier and for each of a plurality of combinations of the sub-carrier and an antenna of a plurality of antennas to be used for transmitting the data, a transmission characteristic of a transmission of the sub-carrier using the antenna; and selecting, for each sub-carrier, an antenna of the plurality of antennas to be used for the transmission of the sub-carrier based on the transmission characteristic of the transmission of the sub-carrier between the antenna and the receiver.

63 Claims, 22 Drawing Sheets

OTHER PUBLICATIONS

Kunisch, J., et al., "Measurement Results and Modeling Aspects for the UWB Radio Channel," IEEE International Conference on Ultra Wideband Systems and Technologies (UWBST 2002), Baltimore, Maryland, US, May 2002, pp. 19-24.

Batra, A., "Multi-band OFDM Physical Layer Proposal," Sep. 2003, http://grouper.ieee.org/groups/802/15/pub/, 69 pages.

FCC, "Revision of Part 15 of the Commissions Rules Regarding Ultra-Wideband Transmission Systems," FCC 02-48, First Report and Order, ET Docket 98-153, Feb. 14, 2002. 118 pages.

Peng, X., et al., "High Rate UWB Transmission with Range Extension," IEEE International Conference on UWB (ICU 2005), pp. 741-746.

Alamouti, S.M., "A Simple Transmit Diversity Technique for Wireless Communications," IEEE J. Select. Areas Commun., vol. 16, issue 8, pp. 1451-1458, Oct. 1998.

Li, Y., et al., Transmitter Diversity for OFDM Systems and Its Impact on High-Rate Data Wireless Networks, IEEE J. Select. Area Commun. vol. 17, issue 7, pp. 1233-1243, Jul. 1999.

Bolcskei, H., "Space-Frequency Coded Broadband OFDM Systems," IEEE, WCNC 2000, vol. 1, pp. 1-6.

Cimini, L.J., et al., "Clustered OFDM with Transmitter Diversity and Coding," IEEE, GLOBLCOM 1996, pp. 703-707.

Shi, H., et al., "An Adaptive Antenna Selection Scheme for Transmit Diversity in OFDM Systems," IEEE 54th Vehicular Technology Conference, VTC Fall 2001, vol. 4, pp. 2168-2172.

Peng, X., et al., "Multi-Band Space-Frequency Transmit Selection (Multi-Band SFTS) for MB-OFDM UWB Systems with Multiple Transit Antennas," ID2006078, Institute for Infocomm Research, Dec. 20, 2006, 28 pages.

International Search Report in connection with PCT/SG2008/000355 mailed Dec. 10, 2008, 3 pages.

Written Opinion of the International Searching Authority in connection with PCT/SG2008/000355 mailed Dec. 10, 2008, 6 pages.

China Patent Office, Office Action for Chinese Patent Application No. 200880116494.2, Aug. 31, 2012, 9 pages.

* cited by examiner

1001

| Method 2b - Step 1 | | |
|---|---|---|
| | Ant1 | Ant2 |
| Sub1 | 2.9 | 0.5 |
| Sub2 | 2.5 | 0.9 |
| Sub3 | 2.1 | 1.5 |
| Sub4 | 1.3 | 2.6 |
| Sub5 | 1.9 | 3.5 |
| Sub6 | 2.6 | 2.3 |
| Sub7 | 3.0 | 1.7 |
| Sub8 | 3.2 | 0.3 |
| # of Sub Selected | 6 | 2 |

1003

| Method 2b - Step 2 | | |
|---|---|---|
| | Ant1 | Ant2 |
| Sub1 | 2.9 | 0.5 |
| Sub2 | 0.0 | 0.9 |
| Sub3 | 2.1 | 1.5 |
| Sub4 | 1.3 | 2.6 |
| Sub5 | 1.9 | 3.5 |
| Sub6 | 0.0 | 2.3 |
| Sub7 | 3.0 | 1.7 |
| Sub8 | 3.2 | 0.3 |
| # of Sub Selected | 4 | 2 |

1005

| Method 2b - Step 3 | | |
|---|---|---|
| | Ant1 | Ant2 |
| Sub1 | 2.9 | 0.5 |
| Sub2 | 0.0 | 0.9 |
| Sub3 | 2.1 | 1.5 |
| Sub4 | 1.3 | 2.6 |
| Sub5 | 1.9 | 3.5 |
| Sub6 | 0.0 | 2.3 |
| Sub7 | 3.0 | 1.7 |
| Sub8 | 3.2 | 0.3 |
| # of Sub Selected | 4 | 4 |

Figure 10

|  | Characteristic | Max delay |
|---|---|---|
| CM1 | LOS, 0-4m | $\tau_{max}$=8.92ns |
| CM2 | NLOS, 0-4m | $\tau_{max}$=26.786ns |
| CM3 | NLOS, 4-10m | $\tau_{max}$=56.413ns |
| CM4 | Extreme NLOS, 4-10m | $\tau_{max}$=77.111ns |

METHOD OF TRANSMITTING DATA TO A RECEIVER

The present application claims the benefit of the U.S. provisional application 60/973,594 (filed on 19 Sep. 2007), the entire contents of which are incorporated herein by reference for all purposes.

FIELD OF THE INVENTION

Embodiments of the invention relate to the field of wireless communication systems, such as ad hoc wireless ultra-wideband radio communication systems, for example. By way of example, embodiments of the invention relate to a method of transmitting data to a receiver, as well as a corresponding communication device.

BACKGROUND OF THE INVENTION

It is known that in general, the transmission range of a signal is primarily determined by the transmit power of the signal. In the case where the transmit power of the signal is limited due to Federal Communications Commission (FCC) regulations, for example, the transmission range of the signal is also limited. For example, according to the IEEE 802.15.3a technical requirements, in view of the FCC transmit Power Spectral Density (PSD) mask, the expected signal transmission range may be only about 10 meters for a data transmission of 100 Mbps, or about 4 meters for a data transmission of 200 Mbps, or about 2 meters for a data transmission of 480 Mbps.

Such a short signal transmission range (for example as discussed above) for a communication system in general puts severe constraints on the potential applications of the said communication system. It is therefore desirable to increase the signal transmission range for such a communication system while still adhering to the transmission power restrictions due to FCC regulations, for example.

SUMMARY OF THE INVENTION

In one embodiment of the invention, a method of transmitting data to a receiver, wherein the data is transmitted using a plurality of sub-carriers, is provided. The method provided includes determining, for each sub-carrier and for each of a plurality of combinations of the sub-carrier and an antenna of a plurality of antennas to be used for transmitting the data, a transmission characteristic of a transmission of the sub-carrier using the antenna; and selecting, for each sub-carrier, an antenna of the plurality of antennas to be used for the transmission of the sub-carrier based on the transmission characteristic of the transmission of the sub-carrier between the antenna and the receiver.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various embodiments of the invention are described with reference to the following drawings, in which:

FIG. 10 shows an illustration of a third implementation of a method of transmitting data to a receiver according to one embodiment of the invention.

DETAILED DESCRIPTION OF THE INVENTION

Figure 1:
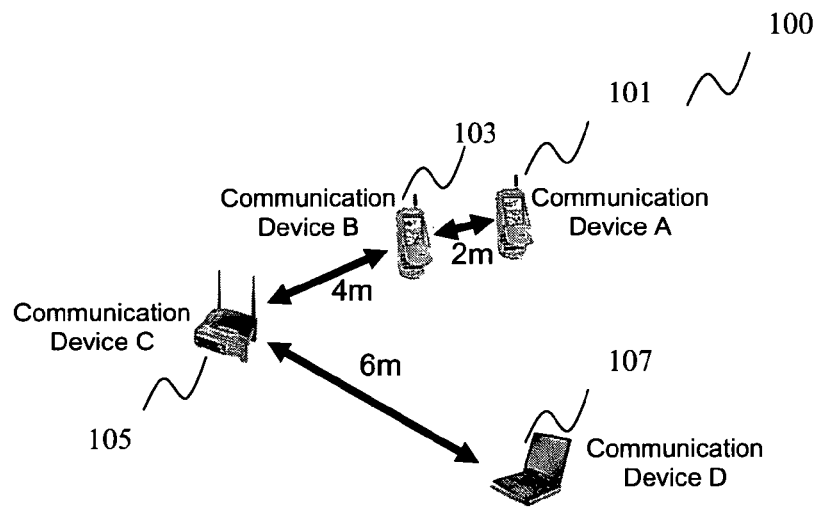
FIG. 1 shows a communication system according to an embodiment of the invention.

Illustratively, a communication device with a single antenna may only have a short signal transmission range and may not be robust enough to overcome indoor shadowing or fading, for example, when its transmit power is limited by FCC regulations. In order to overcome the above disadvantages, spatial diversity via a plurality of transmit antennas may be used in such a communication device where its transmit power may be limited by the said FCC regulations, for example.

In more detail, for a communication device where the data to be transmitted may be modulated on a plurality of sub-carriers, a mapping between the sub-carriers and the antennas may be carried out according to a predetermined criterion. With a suitable mapping, spatial diversity via the plurality of transmit antennas may be achieved and the transmit power for each of the transmit antennas may also be controlled such that it meets the said FCC regulations.

According to one embodiment of the invention, a method of transmitting data to a receiver, wherein the data is transmitted using a plurality of sub-carriers, is provided. The method provided includes determining, for each sub-carrier and for each of a plurality of combinations of the sub-carrier and an antenna of a plurality of antennas to be used for transmitting the data, a transmission characteristic of a transmission of the sub-carrier using the antenna; and selecting, for each sub-carrier, an antenna of the plurality of antennas to be used for the transmission of the sub-carrier based on the transmission characteristic of the transmission of the sub-carrier between the antenna and the receiver. The transmission characteristics are determined separately or individually for each sub-carrier such that the transmission characteristic for a transmit antenna is determined dependent on the sub-carrier. Thus, in one embodiment, different transmission characteristics of a transmit antenna for different sub-carriers are taken into account.

According to one embodiment of the invention, a communication system for transmitting data is provided, wherein the data is transmitted using a plurality of sub-carriers. The communication system provided includes a receiver, and a selection unit configured to determine, for each sub-carrier and for each of a plurality of combinations of the sub-carrier and an antenna of a plurality of antennas to be used for transmitting the data, a transmission characteristic of a transmission of the sub-carrier using the antenna, and to select, for each sub-carrier, an antenna of the plurality of antennas to be used for the transmission of the sub-carrier based on the transmission characteristic of the transmission of the sub-carrier between the antenna and the receiver.

The selection may be carried out in the transmitter or the receiver. For example, the receiver selects the antennas to be used and signals the selection to the transmitter. Alternatively, the transmitter carries out the selection itself based on the transmission characteristic.

When the selection has been carried out, the data may be transmitted from the transmitter to the receiver according to the selection, i.e. using the sub-carriers and using, for each sub-carrier, the selected antenna (or the selected antennas) for the transmission of the sub-carrier.

Embodiments of the invention emerge from the dependent claims.

In one embodiment, the data to be transmitted using the plurality of sub-carriers is the data of a communication channel of an upper communication layer. For example, the data to be transmitted are useful data of the same logical channel or the same transport channel. For example, the data to be transmitted is data which should all be transmitted to the same receiver. The transmission using the sub-carriers is for example based on the same transmission technology (for example based on the same modulation). For example, the sub-carriers are sub-carriers according to an OFDM transmission or another multi-carrier transmission technology.

In one embodiment, the antenna that is used for the transmission of a sub-carrier is selected based on a predetermined criterion with respect to the transmission characteristic.

In one embodiment, the method provided further includes receiving, by a transmitter, a signal from the receiver, and determining the transmission characteristic based on the received signal.

In one embodiment, the data is to be transmitted from the transmitter to the receiver and the selection is carried out by the transmitter.

In one embodiment, the data is to be transmitted from the transmitter to the receiver and the selection is carried out by the receiver. In another embodiment, the receiver signals the selection to the transmitter.

In one embodiment, the receiver receives the transmitted data via one antenna or a plurality of antennas.

In one embodiment, the transmission characteristic is information about a property of the communication channel used for transmitting the sub-carrier between the antenna and the receiver. In another embodiment, the transmission characteristic is information about the quality of the communication channel. In yet another embodiment, the transmission characteristic is a channel state information.

In one embodiment, the data is transmitted by modulation of the plurality of sub-carriers and transmitting the modulated sub-carriers using the antennas.

In one embodiment, the selection is carried out based on a comparison of the transmission characteristics of a transmission of the sub-carrier for different transmission antennas.

In one embodiment, for each sub-carrier of the plurality of sub-carriers, an antenna of the plurality of antennas is selected to be used for transmitting the sub-carrier.

In one embodiment, the selection is carried out individually for each of the plurality of sub-carriers.

In one embodiment, the predetermined criterion includes the antennas being selected for the sub-carriers such that the antenna with the highest quality in the transmission characteristic is selected for each sub-carrier.

In one embodiment, the predetermined criterion includes a maximum number of sub-carriers to be distributed to each antenna. In another embodiment, the predetermined criterion further includes the antennas being selected for the sub-carriers such that the antenna with the highest quality in the transmission characteristic is selected for each sub-carrier. In yet another embodiment, the predetermined criterion further includes the antennas being selected for the sub-carriers such that for each antenna, the number of sub-carriers for which the antenna has been selected is below or equals to the determined maximum number of sub-carriers.

In one embodiment, the method provided further includes determining a transmission characteristic of a transmission of the sub-carrier from the receiver to the antenna. In another embodiment, the method provided further includes compensating the difference between the properties of the transmission of the sub-carrier from the receiver to the antenna that is used for transmission of the sub-carrier and the properties of the transmission of the sub-carrier from the antenna that is used for transmission of the sub-carrier to the receiver.

In one embodiment, the method for compensating the difference comprises determining the transmission characteristic of the sub-carrier from the receiver to the antenna, and using a calibration factor to compensate the difference, wherein the calibration factor is determined as a function of a transmission characteristic of the antenna and a reception characteristic of the antenna.

In a further embodiment, the method for compensating the difference further comprises multiplying the calibration factor with the determined transmission characteristic of the sub-carrier from the receiver to the antenna to obtain a compensated transmission characteristic of the transmission, and selecting the antenna for transmission based on the compensated transmission characteristic.

In one embodiment, the receiver comprises a plurality of antennas for receiving the transmitted data, and the calibration factor is determined as a function of a transmission characteristic of the receiving antennas and a reception characteristic of the receiving antennas.

In one embodiment, a pre-scaling factor is applied to channel estimation symbols at the receiver side, the channel estimation symbols being sent from the receiver to the transmitter, and being used to determine the transmission characteristic of the sub-carrier from the receiver to the antenna, such that the transmission characteristic of the sub-carrier from the receiver to the antenna is scaled with the pre-scaling factor, wherein the pre-scaling factor is reciprocal of the function of the transmission characteristic of the receiving antennas and the reception characteristic of the receiving antennas. Channel estimation symbols refer to the transmitted pilot symbols that will be used to estimate the channel state information or channel frequency response.

In one embodiment, the transmission characteristic of the antenna is the amplitude mismatch of a transmitting frequency response function of the antenna. In one embodiment, the reception characteristic of the antenna is the amplitude mismatch of a receiving frequency response function of the antenna.

In one embodiment, each of the plurality of the antennas that are used for transmission of the sub-carries has a respective calibration factor, and all the calibration factors are stored in a memory.

In one embodiment, the communication system provided further includes a transmitter including a receiving unit configured to receive a signal from the receiver, and a first determining unit configured to determine the transmission characteristic based on the received signal. In another embodiment, the communication system provided further includes a second determining unit configured to determine a transmission characteristic of a transmission of the sub-carrier from the receiver to the antenna. In yet another embodiment, the communication system provided further includes a compensating unit configured to compensate the difference between the properties of the transmission of the sub-carrier from the receiver to the antenna and the properties of the transmission of the sub-carrier from the antenna to the receiver.

In one embodiment, the compensation unit uses a calibration factor for compensating the difference, and the calibration factor is a function of a transmission characteristic of the antenna and a reception characteristic of the antenna.

In one embodiment, the receiver comprises a plurality of antennas for receiving the transmitted data, and the calibration factor is a function of a transmission characteristic of the receiving antennas and a reception characteristic of the receiving antennas.

In one embodiment, the compensation is by multiplying the calibration factor with the transmission characteristic of the transmission of the sub-carrier from the receiver to the antenna.

In one embodiment, each of the plurality of antennas for the transmission of the sub-carries has a respective calibration factor.

In one embodiment, a pre-scaling factor is applied to channel estimation symbols at the receiver side, the channel estimation symbols being sent from the receiver to the transmitter, and being used to determine the transmission characteristic of the sub-carrier from the receiver to the antenna, such that the transmission characteristic of the sub-carrier from the receiver to the antenna is scaled with the pre-scaling factor, wherein the pre-scaling factor is reciprocal of the function of the transmission characteristic of the receiving antennas and the reception characteristic of the receiving antennas.

In one embodiment, each of the plurality of antennas for the transmission of the sub-carries has a respective calibration factor. In a further embodiment, the communication system comprises a memory for storing calibration factors of all the antennas that are used for the transmission of the sub-carriers.

In one embodiment, the communication system is an ad hoc radio communication system.

In one embodiment, the communication system is a WiMedia communication system. In another embodiment, the communication system is a Bluetooth communication system.

In one embodiment, the communication system is a Firewire communication system. In another embodiment, the communication system is a Certified Wireless Universal Serial Bus (USB) communication system.

FIG. 1 shows a communication system 100 according to an embodiment of the invention.

In this illustration, the communication system 100 may include a first communication device (A) 101, a second communication device (B) 103, a third communication device (C) 105, and a fourth communication device (D) 107.

Illustratively, it can be seen that the transmission range between the first communication device (A) 101 and the second communication device (B) 103 may be limited to, say, 2 meters (m), for example. The limitation in the transmission range may be the result of an existing limitation on the transmit power due to FCC regulations, for example.

In this illustration, the communication system 100 may represent an ultra-wideband radio communication system, such as the WiMedia communication system, for example. The WiMedia communication system may operate in a high data rate transmission, such as at 480 Mbps, for example. Subsequently, the WiMedia communication system may be used for further illustration of the embodiments of invention.

Further, it can be seen that the transmission range between the second communication device (B) 103 and the third communication device (C) 105 may be limited to, say, 4 m, for example. This transmission range is about two times larger than the transmission range between the first communication device (A) 101 and the second communication device (B) 103. The larger transmission range between the second communication device (B) 103 and the third communication device (C) 105 may be due to the third communication device (C) 105 using more than one antenna in conjunction with signal processing techniques, according to an embodiment of the invention.

As a further illustration, it can be seen that the transmission range between the third communication device (C) 105 and the fourth communication device (D) 107 may be limited to, say 6 m, for example. This transmission rage is about three times larger than the transmission range between the first communication device (A) 101 and the second communication device (B) 103. The larger transmission range between the third communication device (C) 105 and the fourth communication device (D) 107 is due to the using a smart antenna array, or a plurality of antennas, at both the transmitter and the receiver side (the third communication device (C) 105 and the fourth communication device (D) 107) to achieve an improved signal to noise ratio (SNR) for the received signal (and thus achieve an extended transmission range), for example. In this context, the Maximum Ratio Combining (MRC) signal processing technique may be used to exploit the spatial diversity of the plurality of antennas at the receiver, for example. In the forward link, a transmitter, such as the third communication device (C) 105, having a plurality of antennas can use such as antenna selection technique to extend the transmission range, and the receiver, such as the fourth communication device (D) 107, using a plurality of antennas can also use MRC technique to further extend the transmission range. In the backward link, the receiver becomes a transmitter and the transmitter becomes a receiver.

In more detail, in the Maximum Ratio Combining (MRC) signal processing technique, each individually demodulated received signal (for each sub-carrier) is linearly combined before the process of equalization is carried out. As such, the Maximum Ratio Combining (MRC) signal processing technique effectively optimizes the signal to noise ratio (SNR) for each sub-carrier.

On the other hand, the transmission range on the forward link (i.e., from the third communication device (C) 105 to the second communication device (B) 103, or to the fourth communication device (D) 107) may be extended by deploying the plurality of antennas as multiple transmit antennas.

In this context, it should be noted that a large number of conventional transmit diversity techniques may not be used in conjunction with the plurality of (transmit) antennas on the third communication device (C) 105, for various reasons. For example, the optimal transmit beamforming (or eigen-beamforming or water-filling) technique, which is typically used for conventional narrowband systems, may not be used on the third communication device (C) 105 to extend the transmission range, as so doing will result in violating the transmit power limitations of the said FCC regulations, for example.

As a further example, the Space Time Coding (STC) technique, for example, may be used in conjunction with multiple transmit antennas to achieve transmit diversity, in order to achieve improved performance as well as an extended transmission range. However, a corresponding decoding may be required at the receiver side. As such, the third communication device (C) 105 using the Space Time Coding (STC) technique may not maintain interoperability with a conventional communication device, such as the first communication device (A) 101 and the second communication device (B) 103, for example.

The transmit diversity techniques used in conjunction with the plurality of antennas for the third communication device (C) 105 will be discussed in more detail in relation to FIG. 4 later.

Figure 2:
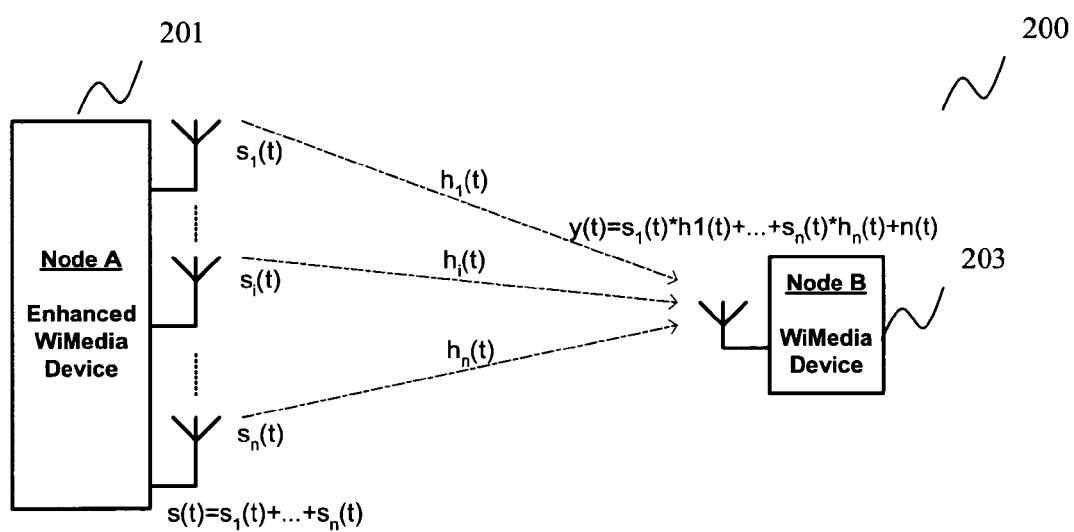
FIG. 2 shows a flow diagram describing the data transmission carried out in the communication system according to one embodiment of the invention, wherein a communication device receiving data (node B) uses one receiving antenna.

FIG. 2 shows a block diagram 200 describing the data transmission carried out in the communication system 100 according to one embodiment of the invention.

In this illustration, Node A 201 may be the third communication device (C) 105 shown in FIG. 1 and Node B 203 may be the second communication (B) 103 shown in FIG. 1, for example. Further, it can be seen that Node A 201 may use multiple transmit antennas, while node B 203 may use a single antenna.

In one embodiment, the transmission range may be extended on the forward transmission link from node A 201 to node B 203 using the multiple transmit antennas. Meanwhile, the transmission range may be extended on the reverse link from node B 203 to node A 201 using the Maximum Ratio Combining (MRC) signal processing technique at node A 201, in order to achieve an improved signal to noise ratio (SNR) (and hence achieve an extended transmission range as well). As such, node A 201 may transmit and receive data with node B 203 over the extended transmission range.

In this context, node B 203 may represent a standard WiMedia communication device, for example, which uses only one antenna. Further, node A 201 may represent an enhanced WiMedia communication device, for example, which may use a plurality of antennas. When node A 201 works as a transmitter, it may employ the transmit diversity technique given in this invention. When node A 201 works as a receiver, it may employ signal processing techniques such as the Maximum Ratio Combining (MRC) signal processing technique, for example.

Figure 3:
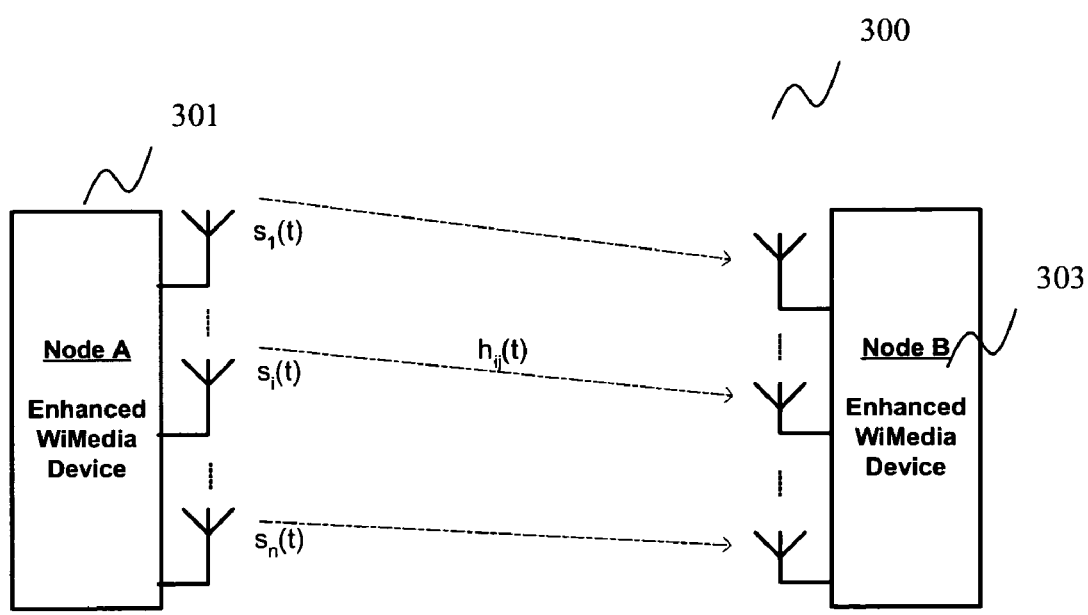
FIG. 3 shows a flow diagram describing the data transmission carried out in the communication system according to one embodiment of the invention, wherein a communication device receiving data (node B) uses a plurality of receiving antennas.

FIG. 3 shows a block diagram 300 describing the data transmission carried out in the communication system 100 according to one embodiment of the invention.

In this illustration, Node A 301 may be the third communication device (C) 105 shown in FIG. 1 and Node B 303 may be the fourth communication (D) 107 shown in FIG. 1, for example. Further, it can be seen that Node A 301 may use multiple transmit antennas, and node B 303 may use multiple receiving antennas.

In one embodiment, the transmission range may be extended on the forward transmission link from node A 301 to node B 303 using the multiple transmit antennas similarly as illustrated in FIG. 2. Also, the transmission range may be extended on the reverse link from node B 303 to node A 301 using the Maximum Ratio Combining (MRC) signal processing technique at node A 301, in order to achieve an improved signal to noise ratio (SNR) (and hence achieve an extended transmission range as well). Meanwhile, the transmission range may be extended on the forward link from node A 301 to node B 303 using a plurality of receiving antennas at node B 303, as well as the MRC signal processing technique at node B 303, in order to achieve an improved SNR (and hence achieve an extended range as well). As such, node A 301 may transmit and receive data with node B 303 over the extended transmission range.

Both node A 301 and node B 303 may represent an enhanced standard WiMedia communication device, for example, which uses a plurality of antennas, and which may employ signal processing techniques such as the Maximum Ratio Combining (MRC) signal processing technique, for example.

Figure 4:
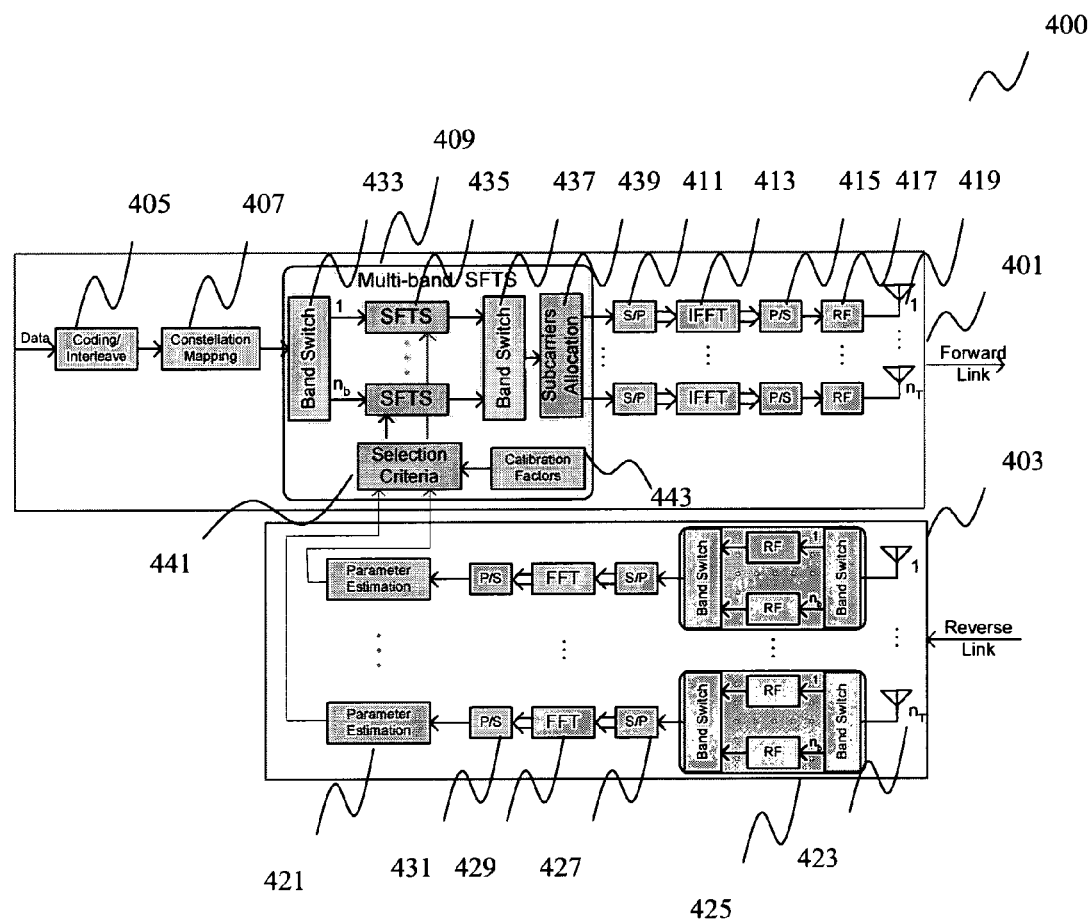
FIG. 4 shows a block diagram of a communication device as a transmitter according to one embodiment of the invention, having a plurality of transmission antennas.

FIG. 4 shows a block diagram 400 of the third communication device (C) 105 according to one embodiment of the invention.

The communication device (C) 105 may include a transmit unit 401 and a receive unit 403.

The transmit unit 401 may be used to transmit data on the forward link, to other communication devices, for example. The transmit unit 401 may include a coding/interleaving unit 405, a constellation mapping unit 407, a multi-band space frequency transmit selection (SFTS) unit 409, a plurality of serial to parallel (S/P) converter units 411, a plurality of Inverse Fast Fourier Transform (IFFT) units 413, a plurality of parallel to serial (P/S) converter units 415, a plurality of radio frequency (RF) units 417 and a plurality of antennas 419.

The data to be transmitted may be first processed by the coding/interleaving unit 405 and the constellation mapping unit 407. According to one embodiment, the multi-band space frequency transmit selection (SFTS) unit 409 may implement the method of transmitting data to a receiver, in conjunction with the plurality of parameter estimation units 421 of the receiver unit 403. The multi-band space frequency transmit selection (SFTS) unit 409 and plurality of parameter estimation units 421 will be discussed in more detail subsequently.

It should be noted that the plurality of serial to parallel (S/P) converter units 411, the plurality of Inverse Fast Fourier Transform (IFFT) units 413 and the plurality of parallel to serial (P/S) converter units 415 may be conventional units which may be used together in order to generate an OFDM symbol, for example.

The processed data signal (after the plurality of parallel to serial (P/S) converter units 415) may then be passed to the plurality of radio frequency (RF) units 417 for further processing, before being transmitted using the plurality of antennas 419.

The receive unit 403 may be used to receive data on the reverse link, from other communication devices, for example. The receive unit 403 may include a plurality of antennas 423, a plurality of radio frequency (RF) switching units 425, a plurality of serial to parallel (S/P) converter units 427, a plurality of Fast Fourier Transform (FFT) units 429, a plurality of parallel to serial (P/S) converter units 431 and a plurality of parameter estimation units 421.

The received signal at the plurality of antennas 423 may be first processed by the plurality of radio frequency (RF) switching units 425, before being passed on to the plurality of serial to parallel (S/P) converter units 427.

It should be noted that the plurality of serial to parallel (S/P) converter units 427, the plurality of Fast Fourier Transform (IFFT) units 429 and the plurality of parallel to serial (P/S) converter units 431 may be conventional units which may be used together in order to extract data or information, for example, from an OFDM symbol, for example.

As mentioned earlier, the plurality of parameter estimation units 421 and the multi-band space frequency transmit selection (SFTS) unit 409 may implement the method of transmitting data to a receiver. In this context, the plurality of parameter estimation units 421 may be used to obtain measurements on a transmission characteristic of the transmission channel.

In one embodiment, the transmission characteristic may be information about a property of the communication channel used for transmitting the sub-carrier between the antenna and the receiver. In another embodiment, the transmission characteristic may be information about the quality of the communication channel. In yet another embodiment, the transmission characteristic may be the channel state information.

In this context, the transmission characteristic may be, but is not limited to, a measurement of the signal amplitude, a measurement of the signal power or a measurement of the signal to noise ratio (SNR), for example.

As an illustrative example, a measurement of the channel state information (CSI), which may include channel frequency response for each sub-carrier at each sub-band for each antenna, may be obtained using the training pilot symbols from the reverse link.

Further, the multi-band space frequency transmit selection (SFTS) unit 409 may include a first band switch unit 433, a plurality of space frequency transmit selection (SFTS) units 435, a second band switch unit 437, a sub-carrier allocation unit 439, a selection criteria unit 441 and a calibration factors unit 443.

The first band switch unit 433, the plurality of space frequency transmit selection (SFTS) units 435, the second band switch unit 437 and the sub-carrier allocation unit 439, may be used together to map or allocate a plurality of sub-carriers to their respective antennas in the plurality of antennas 419.

The mapping or allocation of the plurality of sub-carriers to their respective antennas may be determined by the selection criteria unit 441, based on the measurements on the transmission characteristic of the transmission channel provided by the plurality of parameter estimation units 421.

Additionally, the calibration factors provided by the calibration factors unit 443 may be used by the selection criteria unit 441 to compensate for measurement inaccuracies, for example, in the measurements provided by the plurality of parameter estimation units 421. The function of the calibration factors unit 443 will be discussed in more detail later in relation to FIGS. 14-18.

Figure 5:
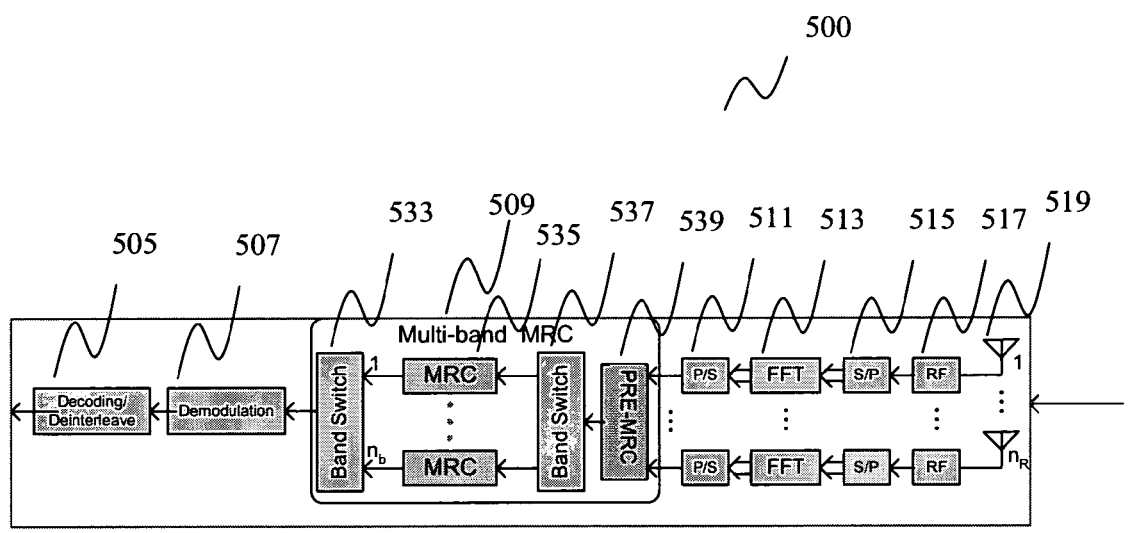
FIG. 5 shows a block diagram of a communication device as a receiver according to one embodiment of the invention, having a plurality of receiving antennas.

FIG. 5 shows a block diagram 500 of the receiver of the fourth communication device (D) 107 according to one embodiment of the invention.

The receiver 500 may include a plurality of receiving antennas 519, a plurality of radio frequency (RF) units 517, a plurality of serial to parallel (S/P) converter units 515, a plurality of Fast Fourier Transform (FFT) units 513, a plurality of parallel to serial (P/S) converter units 511, a multi-band Maximum Ratio Combining (MRC) unit 509, a demodulation unit 507, and a decoding/deinterleave unit 505.

The received signal at the plurality of antennas 519 may be first processed by the plurality of radio frequency (RF) units 517, before being passed on to the plurality of serial to parallel (S/P) converter units 515.

It should be noted that the plurality of serial to parallel (S/P) converter units 515, the plurality of Fast Fourier Transform (FFT) units 513 and the plurality of parallel to serial (P/S) converter units 511 may be conventional units which may be used together in order to extract data or information, for example, from an OFDM symbol, for example.

Further, the multi-band Maximum Ratio Combining (MRC) unit 509 may include a pre-MRC unit 539, a first band switch 537, a plurality of MRC units 535 corresponding to each band, and a second band switch unit 533. In this regard, the pre-MRC unit 539 takes the input signals from different antenna channels and does the parameter estimation (such as channel state information estimation) for each antenna channel, and the MRC unit 535 optimized the SNR for each sub-carrier of each sub-band based on the parameters estimated from the pre-MRC unit 539.

After that, it goes for further demodulation and decoding/deinterleave process. The communication system illustrated in FIGS. 3-5 is also referred as the multi-band space frequency transmit selection (SFTS) with Multiple-input and multiple-output (MIMO) communication system.

The motivation for the embodiments of the method of transmitting data to a receiver is to exploit the statistical nature of multipath fading and to reduce the likelihood of deep fading, and thus, so by doing, achieve the desired diversity. The frequency selective fading channel for each sub-band may be different, and therefore, the respective space frequency transmit selection (SFTS) unit 435 for each sub-band may be different. Based on the respective implementations of the selection criteria unit 441, the SFTS sub-module may be controlled to allocate the sub-carriers for each antenna in each sub-band accordingly.

Let there be $n_T$ antennas and $n_b$ sub-bands for the third communication device (C) 105 with multiple transmit antennas.

In the first illustration, the case is considered in which the third communication device (C) communicates with the second communication device (B) which comprises one receiving antenna, for example.

Let $H_k^{(i,j)} = H_k(f_0 + j\Delta f)$ ($i = 1, \ldots, n_b$; $j = 1, \ldots, n_c$; $k = 1, \ldots, n_T$) represent the frequency response of the $j^{th}$ sub-carrier for the $k^{th}$ transmitting antenna in the $i^{th}$ sub-band, where $f_0$ denotes the carrier frequency, $\Delta f$ denotes the sub-carrier spacing, i.e. the frequency difference between adjacent sub-carriers, and $n_c$ denotes the total number of sub-carriers.

For the $j^{th}$ sub-carrier in the $i^{th}$ sub-band, the best antenna for each SFTS sub-module may then be selected as $$k_{best}^{(i,j)} = \underset{k \in [1, n_T]}{\arg\max} A_{i,j}(k) \tag{1}$$

where $A_{i,j}(k)$ represents the selection criteria which may be the function of the adjusted channel state information (CSI), for example, incorporated with the respective calibration factors for the $j^{th}$ sub-carrier and the $i^{th}$ sub-band. For example, $A_{i,j}(k)$ may be determined based on the signal power, such as $A_{i,j}(k) = |H_k^{(i,j)}|^2$, for example, or it may be determined based on the signal to noise ratio (SNR), such as $A_{i,j}(k) = SNR_k^{(i,j)}$, for example.

The subsequent discussion will be based on the illustration of $A_{i,j}(k)$ being determined based on the signal power. However, it should be noted that the subsequent discussion may be easily extended to the alternative methods of determining $A_{i,j}(k)$.

Figure 6:
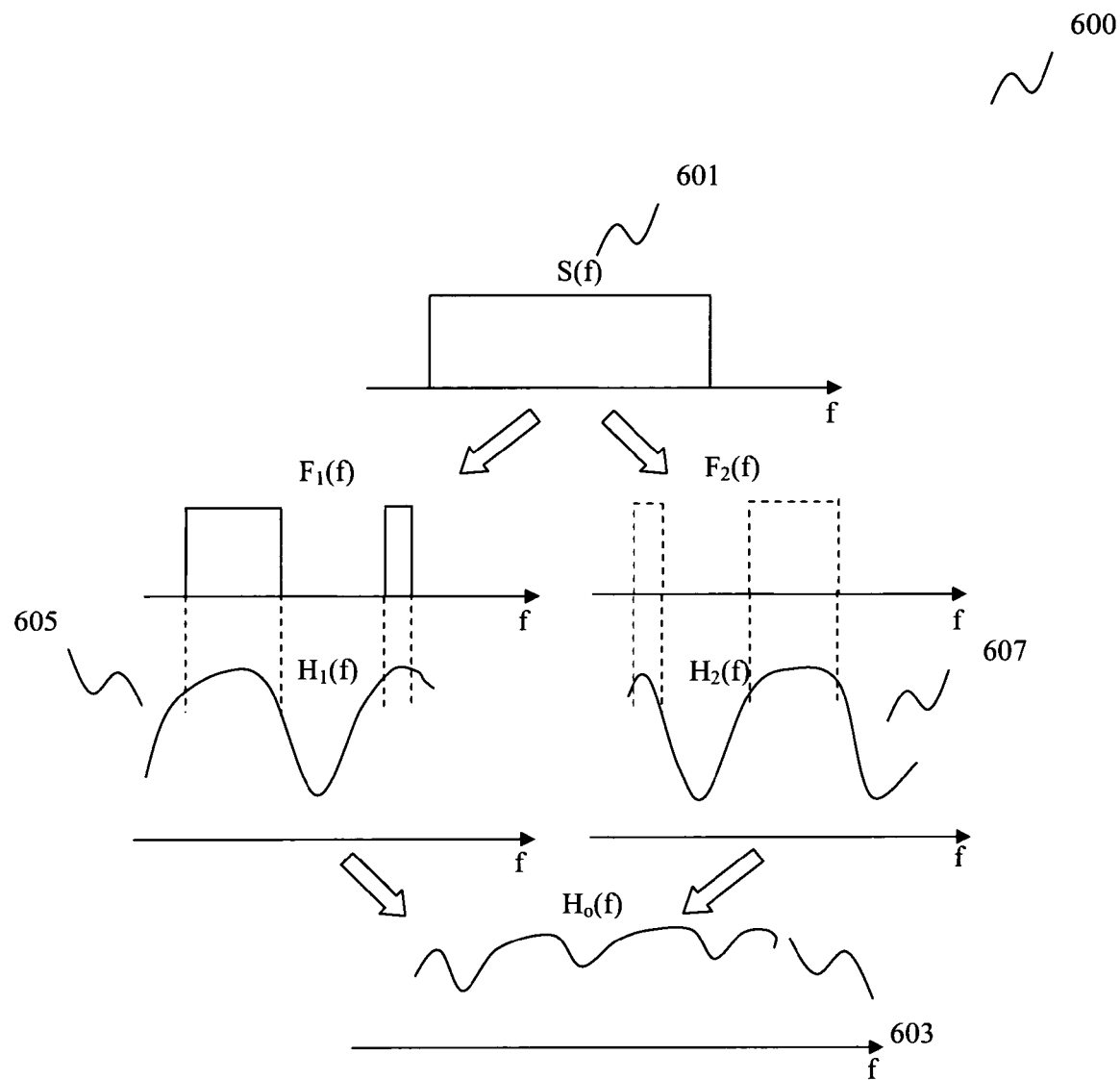
FIG. 6 shows an illustration of the frequency domain representation of a method of transmitting data to a receiver according to one embodiment of the invention.

FIG. 6 shows an illustration of the frequency domain representation of the method of transmitting data to a receiver according to one embodiment of the invention.

The illustration in FIG. 6 shows how one embodiment of the method of transmitting data to a receiver achieves spatial and frequency diversity.

In more detail, the mathematical representation of the signal flow may be described as follows.

Let S(f) 601 represent the transmitted orthogonal frequency division multiplexing (OFDM) signal at node A 201 (in FIG. 2) in frequency domain.

This signal may be represented as a data symbol $d^{(j)}$ in the $j^{th}$ sub-carrier, which may be multiplied with a delta function.

In this context, it should be noted that the sub-band index i may be dropped from Equation (1), for the sake of simplicity and without loss of generality. Thus, index i is dropped in the subsequent equations.

The transmitted OFDM signal S(f) 601 may then be rewritten as $$S(f) = \sum_{j=0}^{n_c - 1} d^{(j)} \delta(f - f_0 - j\Delta f) \tag{2}$$

Next, let $n^{(j)}$ represent the corresponding additive white Gaussian noise (AWGN) term. The received signal may then be written as follows $$Y(f) = \sum_{j=0}^{n_c - 1} \left[ d^{(j)} H_{k_{best}^{(j)}}^{(j)} + n^{(j)} \right] \delta(f - f_0 - j\Delta f) \tag{3}$$

Let $F_k(f)$ represent an ideal filter in frequency domain for all the allocated sub-carriers at the $k^{th}$ transmit antenna, namely, $$F_k(f) = \sum_{j=0}^{n_c - 1} F_k^{(j)} \delta(f - f_0 - j\Delta f) \tag{4}$$

where $$F_k^{(j)} = \begin{cases} 1, & \text{if } k_{best}^{(j)} = k \\ 0, & \text{otherwise} \end{cases} \tag{5}$$

Accordingly, the transmitted OFDM signal in the $k^{th}$ antenna may be written as $$S_k(f) = \sum_{j=0}^{n_c - 1} d^{(j)} F_k^{(j)} \delta(f - f_0 - j\Delta f) = S(f) F_k(f) \tag{6}$$

Additionally, the received signal in frequency domain may be further expressed as $$Y(f) = \sum_{k=1}^{n_T} S_k(f) H_k(f) + N(f) \tag{7}$$

$$= S(f) \sum_{k=1}^{n_T} F_k(f) H_k(f) + N(f)^{\ominus}$$

$$= S(f) H_o(f) + N(f)$$

where $H_o(f)$ 603 may be defined as the combined channel frequency response, as follows $$H_o(f) = \sum_{k=1}^{n_T} F_k(f) H_k(f) \tag{8}$$

As shown in FIG. 6, the combined channel frequency response $H_O(f)$ 603 may have a reduced deep fading characteristic for each sub-carrier (as compared to the respective individual channel frequency responses $H_1(f)$ 605 and $H_2(f)$ 607, for example). Therefore, the embodiment of the method of transmitting data to a receiver leads to an equivalent frequency selective channel $H_o(f)$ 603 with a reduced deep fading characteristic for each sub-carrier.

From Equation (8), the spectrum of the combined transmitted OFDM signals from all transmit antennas may be expressed as $$S_{total}(f) = \sum_{k=1}^{n_T} S_k(f) = \sum_{k=1}^{n_T} S(f)F_k(f) = S(f)\sum_{k=1}^{n_T} F_k(f) = S(f) \quad (9)$$

where $$\sum_{k=1}^{n_T} F_k(f) = 1$$

from Equation (5). Therefore, the embodiment of the method of transmitting data to a receiver allows the spectrum of the combined transmitted OFDM signals (S(f)) 601 to be remained below the stipulated FCC regulations, for example.

Additionally, the time domain signal representation for the embodiment of the method of transmitting data to a receiver may be shown as follows.

Let $s_k(t)$ represent the transmitted OFDM signal in the time domain for the $k^{th}$ transmit antenna at node A 201. Next, let $h_k(t)$ represent the multipath channel impulse response from the $k^{th}$ transmit antenna at node A 201 to the single receive antenna at node B 203.

The received signal y(t) at node B 203 may then be represented as $$y(t) = \sum_{k=1}^{n_T} s_k(t) * h_k(t) + n(t) \quad (10)$$

where the symbol * denotes the convolution operation.

The transmitted OFDM signal at the $k^{th}$ antenna may be represented by the convolution of the transmitted OFDM signal s(t) and the ideal selected filter $f_k(t)$ as follows $$s_k(t) = s(t) * f_k(t) \quad (11)$$

Accordingly, the received signal y(t) may be rewritten as follows $$y(t) = s(t) * \sum_{k=1}^{n_T} f_k(t) * h_k(t) + n(t) = s(t) * h_o(t) + n(t) \quad (12)$$

where $h_O(t)$ is the equivalent channel impulse response with a reduced deep fading characteristic.

Similarly, in a second illustration, the case is considered in which in the communication system 100 shown in FIG. 1, the third communication device (C) communicates with the fourth communication device (D), which comprises a plurality of receiving antennas, for example.

Let $H_{k,j}^{(i,j)} = H_{k,j}(f_0 + j\Delta f)$ (i=1, ..., $n_b$; j=1, ..., $n_c$; k=1, ..., $n_T$; l=1, ..., $n_R$) represent the frequency response of the $j^{th}$ subcarrier from the $k^{th}$ transmitting antenna to the $l^{th}$ receive antenna in the $i^{th}$ sub-band, where $f_0$ denotes the carrier frequency, $\Delta f$ denotes the sub-carrier spacing, i.e. the frequency difference between adjacent sub-carriers, and $n_c$ denotes the total number of subcarriers. For the $j^{th}$ subcarrier in the $i^{th}$ sub-band, the best antenna can then be chosen as $$k_{best}^{(i,j)} = \underset{k \in \{1, n_T\}}{\mathrm{argmax}} A_{i,j}(k, l=1, \ldots, n_R) \quad (13)$$

where $A_{i,j}(k, l=1, \ldots, n_R)$ represents the selection criteria which may be the function of the adjusted channel state information (CSI), for example, incorporated with the calibration factors for the $j^{th}$ subcarrier and the $i^{th}$ sub-band. For example, the $A_{i,j}(k, l=1, \ldots, n_R)$ may be determined based on the Maximum Ratio Combining (MRC) of the received signals, such as $$A_{i,j}(k, l=1, \ldots, n_R) = \sum_{l=1}^{n_R} |H_{k,l}^{(i,j)}|^2,$$

or it may be determined based on the signal to noise ration (SNR) at the receiver, such as $A_{i,j}(k, l=1, \ldots, n_R) = SNR_k^{(i,j)}$, for example. In this context, the subsequent discussion will be based on the illustration of $A_{i,j}(k, l=1, \ldots, n_R)$ being determined based on the MRC. However, it should be noted that the subsequent discussion may be easily extended to the alternative methods of determining $A_{i,j}(k, l=1, \ldots, n_R)$.

Figure 7:
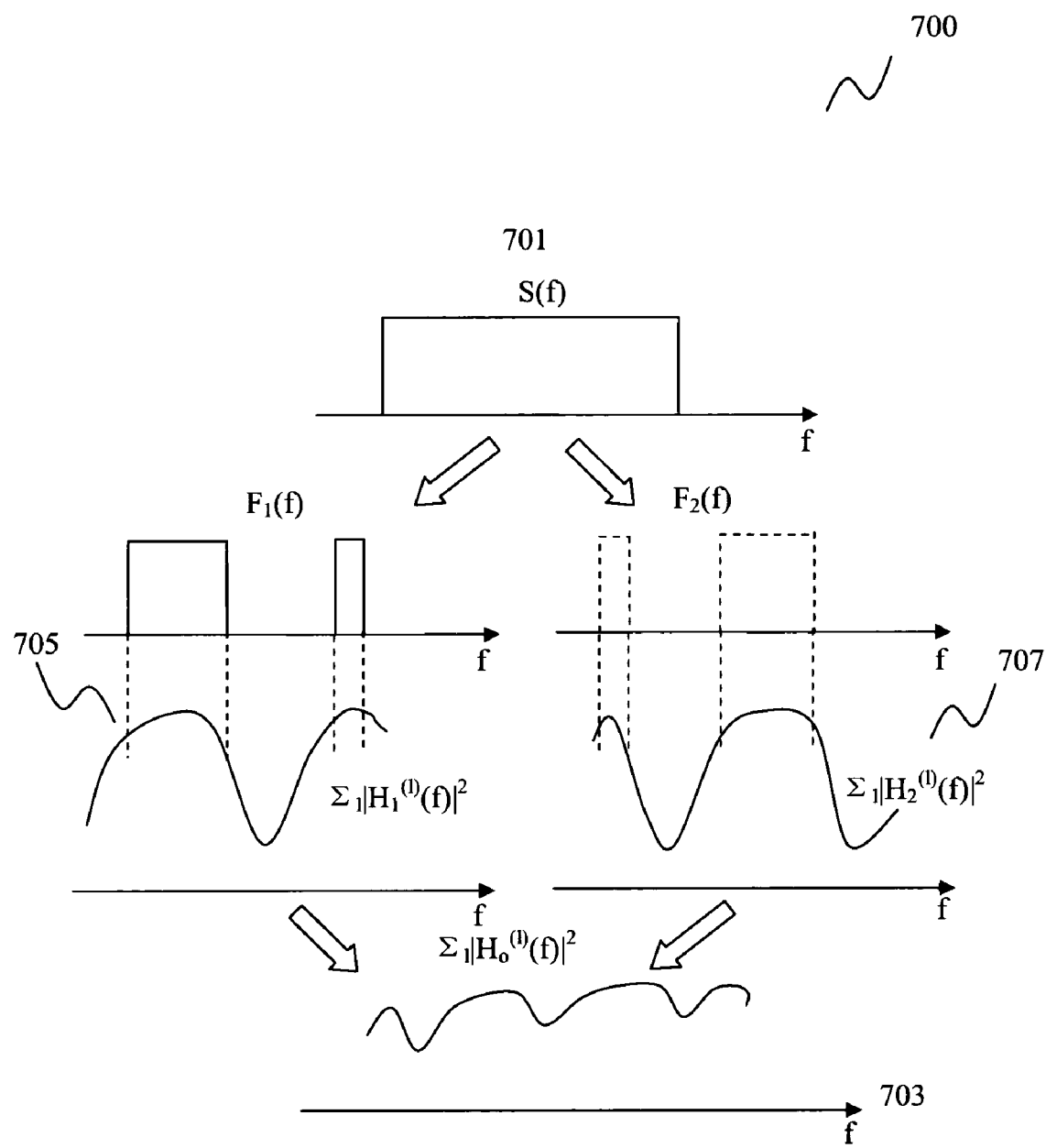
FIG. 7 shows an illustration of the frequency domain representation of a method of transmitting data to a receiver according to another embodiment of the invention, wherein the receiver comprises a plurality of receiving antennas.

FIG. 7 shows an illustration of the frequency domain representation of the method of transmitting data to a receiver according to one embodiment of the invention, wherein node A 301 has a plurality of transmit antennas and node B 303 has a plurality of receiving antennas.

In this illustration, it should be noted that the sub-band index i may be dropped from Equation (13), for the sake of simplicity and without loss of generality. Thus, in the subsequent equations, index i is dropped.

Similarly to the first illustration, let S(f) denote the transmitting OFDM signal at node A 301 (FIG. 3) in frequency domain. It can be represented by data symbol $d^{(j)}$ in the $j^{th}$ subcarrier multiplying with a delta function. Then the transmitted OFDM signal S(f) can be written as Equation (2)

Let $n_l^{(j)}$ be the corresponding AWGN term at the $l^{th}$ receiving antenna. The received signal with MRC can be written accordingly as follows:

$$Z(f) = \sum_{j=0}^{n_c-1} \sum_{l=1}^{n_R} a_l^{(j)} Y_l^{(j)}(f) \quad (14)$$

$$= \sum_{j=0}^{n_c-1} \sum_{l=1}^{n_R} \left[ d^{(j)} |H_{k_{best}^{(j)},l}^{(j)}|^2 + \left(H_{k_{best}^{(j)},l}^{(j)}\right)^* n_l^{(j)} \right] \delta(f - f_0 - j\Delta f)$$

where $a_l^{(j)} = (H_{k_{best}^{(j)},l}^{(j)})^*$ is the combining weight for MRC and the superscript * denotes the conjugate operation. Let the $F_k(f)$ represent an ideal filter in frequency domain for all the allocated sub-carriers at the $k^{th}$ antenna, as expressed in Equations (4) and (5).

Thus, the transmitting OFDM signal in the $k^{th}$ transmit antenna can be written as Equation (6).

And the received signal in frequency domain with MRC may be further represented as $$Z(f) = \sum_{l=1}^{n_R} a_l(f) Y_l(f) \qquad (15)$$

$$= \sum_{l=1}^{n_R} \sum_{k=1}^{n_T} (S(f) F_k(f) |H_{k,l}(f)|^2 + H_{k,l}^*(f) F_k(f) N_l(f))$$

$$= \sum_{l=1}^{n_R} \sum_{k=1}^{n_T} (S(f) |H_{k,l}(f) F_k(f)|^2 + H_{k,l}^*(f) F_k(f) N_l(f))$$

$$= \sum_{l=1}^{n_R} (S(f) |H_o^{(l)}(f)|^2 + N_o^{(l)}(f))$$

where $$a_l(f) = \sum_{k=1}^{n_T} H_{k,l}^*(f) F_k(f) = H_{k_{best}^{(j)},l}^*(f),$$

$$N_o^{(l)}(f) = \sum_{k=1}^{n_T} H_{k,l}^*(f) F_k(f) N_l(f)$$

and $H_o^{(l)}(f)$ may be defined as combined channel frequency response $$H_o^{(l)}(f) = \sum_{k=1}^{n_T} F_k(f) H_{k,l}(f) \qquad (16)$$

As shown in FIG. 7, the combined modulus of channel frequency response $$\sum_{l=1}^{n_R} |H_o^{(l)}(f)|^2$$

has less deep fading possibility for each subcarrier. Therefore, the proposed communication system, wherein node A 301 has a plurality of transmit antennas and node B 303 has a plurality of receiving antennas, leads to equivalent frequency selective channels $H_o^{(l)}(f)$ with much reduced deep fading possibility for each subcarrier. From equation (16), the spectrum of total transmitting OFDM signal from all the transmit antennas is given as Equation (9). Thus, the proposed technique is capable of maintaining the spectrum of total transmitting signal as S(f) under FCC mask.

Equivalently, the time domain signal representation for the embodiment of the method of transmitting data to a receiver may be easily extended from the analysis as illustrated in Equations (10)-(12). Assuming $h_{k,l}(t)$ denotes the multipath channel impulse response from the $k^{th}$ transmit antenna at node A 301 to the $l^{th}$ receiving antenna at node B 303. The received signal $y_l(t)$ at the $l^{th}$ receiving antenna of node B 303 can be represented as $$y_l(t) = \sum_{k=1}^{n_T} s_k(t) * h_{k,l}(t) + n(t) \qquad (17)$$

where symbol * denotes convolution operation. The transmitting OFDM signal in the $k^{th}$ transmit antenna can be represented by the convolution of the transmitting OFDM signal s(t) with the ideal selected filter $f_k(t)$ as expressed in Equation (11).

Thus, the received signal $y_l(t)$ can be rewritten as follows:

$$y_l(t) = s(t) * \sum_{k=1}^{n_T} f_k(t) * h_{k,l}(t) + n_l(t) = s(t) * h_o^{(l)}(t) + n_l(t) \qquad (18)$$

where $h_o^{(l)}(t)$ is the equivalent channel impulse response to the $l^{th}$ receiving antenna with reduced deep fading.

In this context, it should be noted that the method of transmitting data to a receiver may be implemented using different approaches as shown in the following.

Figure 8:
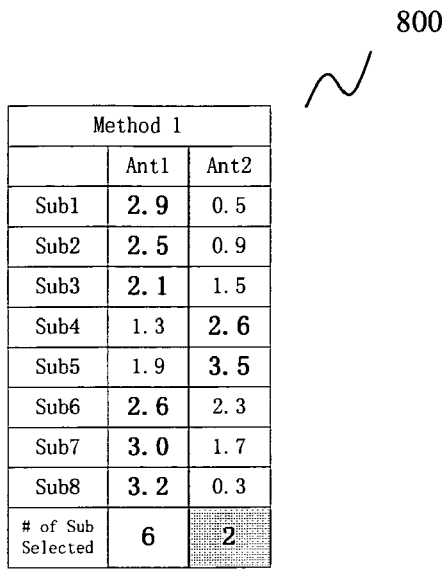
FIG. 8 shows an illustration of a first implementation of a method of transmitting data to a receiver according to one embodiment of the invention.

FIG. 8 shows an illustration of the first implementation of the method of transmitting data to a receiver according to one embodiment of the invention.

In the first implementation of the method of transmitting data to a receiver, a transmission characteristic of a transmission for each sub-carrier and for each of a plurality of combinations of the sub-carrier and an antenna of a plurality of antennas to be used for transmitting the data is determined using the antenna, and the sub-carriers with the highest quality in the transmission characteristic (such as the best frequency response, for example) may be selected for each antenna. In other words, the best antenna for the $j^{th}$ sub-carrier in the $i^{th}$ sub-band may be selected according to the following criteria $$k_{best}^{(i,j)} = \underset{k \in \{1, n_T\}}{\text{argmax}} |H_k^{(i,j)}|^2 \qquad (19)$$

Then, the selected sub-carriers for each antenna can be rewritten as $$k_{best}^{(i,j)} \Rightarrow j_{best}^{(i,k)} \qquad (20)$$

where $j_{best}^{(i,k)}$ indicates cates the best sub-carriers allocation for each antenna in the $i^{th}$ sub-band.

Similarly, for the communication system wherein the receiver comprises a plurality of $n_R$ receiving antennas, the best antenna for the $j^{th}$ subcarrier in the $i^{th}$ sub-band may be selected according to the following criterion $$k_{best}^{(i,j)} = \underset{k \in \{1, n_T\}}{\text{argmax}} \sum_{l=1}^{n_R} |H_{k,l}^{(i,j)}|^2 \qquad (21)$$

For simplicity, the methods of transmitting data to a receiver will be subsequently illustrated without the consideration of the index l ($l=1 \ldots N_R$), which is the case as shown in Equation (19). However, it should be noted that the illustrated methods may be easily extended to the case wherein the receiver comprises a plurality of receiving antennas, which is the case as shown in Equation (21).

In the illustration of the first implementation shown in FIG. 8, two transmit antennas and eight sub-carriers are used.

The first implementation may be carried according to the following steps.

The channel frequency response for the $i^{th}$ sub-band, namely, $|H_k^{(i,j)}|^2$, may be expressed in the form of a matrix, for example, where the rows of the matrix may be represented by the sub-carrier index and the columns of the matrix may be represented by the antenna index.

Next, based on to Equation (19), the best antenna for each sub-carrier may be selected (as indicated in bold as shown in FIG. 8). In this context, it can be seen in FIG. 8 that sub-carriers 4 and 5 are allocated to antenna 2, while the remaining sub-carriers are allocated to antenna 1.

Following which, the channel frequency response for the $i^{th}$ sub-band, namely, $|H_k^{(i,j)}|^2$, may be converted to the sub-carriers allocation for each antenna, namely, $j_{best}^{(i,k)}$, according to equation (20).

In this first implementation, the number of sub-carriers per antenna may be different from one antenna to another, depending on the multipath fading characteristic of the respective antennas. As shown in this illustration, there are 6 sub-carriers allocated to antenna 1, but only 2 sub-carriers to antenna 2. While this first implementation provides an optimal sub-carrier allocation for each antenna, it also leads to a different peak to average ratio (PAPR) value for different antennas (due to the different number of sub-carriers allocated to different antennas).

Figure 9:
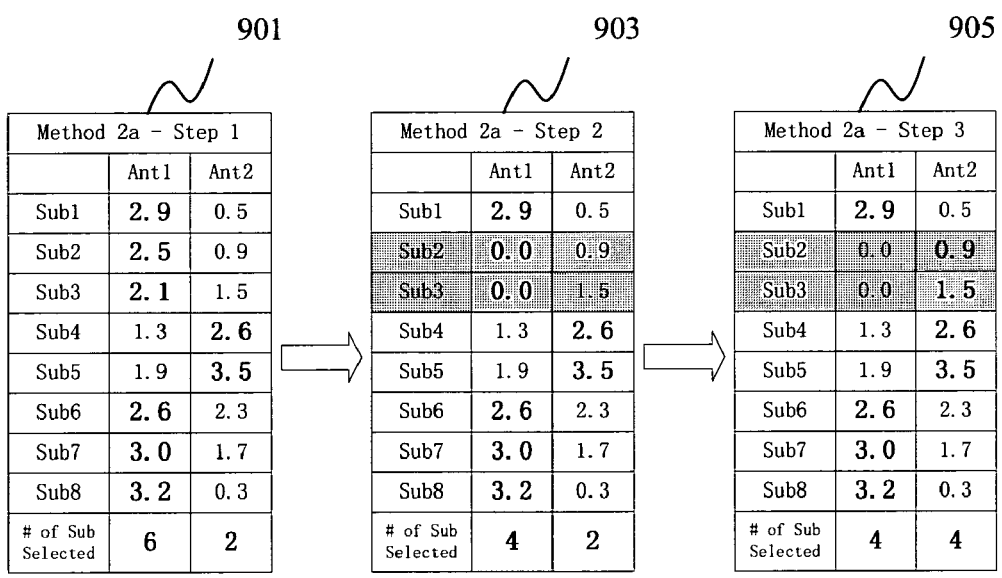
FIG. 9 shows an illustration of a second implementation of a method of transmitting data to a receiver according to one embodiment of the invention.

FIG. 9 shows an illustration of the second implementation of the method of transmitting data to a receiver according to one embodiment of the invention.

Compared to the first implementation of the method of transmitting data to a receiver, this second implementation provides a constraint on the number of sub-carriers which may be allocated to each antenna. This constraint allows the sub-carriers to be evenly distributed among the plurality of antennas, in order to balance the peak to average ratio (PAPR) value for the plurality of (transmit) antennas.

There may be two different approaches to distribute the selected sub-carriers evenly among all the plurality of (transmit) antennas. The first approach uses an optimal way to allocate the sub-carriers evenly, while the second approach uses a simplified way to allocate the sub-carriers in order to achieve a reduced implementation complexity. The second approach will be described in more detail in relation to FIG. 10 later.

If $n_c$ is divisible by $n_T$, then the number of sub-carriers transmitted by each antenna may be limited by $$\frac{n_c}{n_T}.$$

If $n_c$ is not divisible by $n_T$, then each antenna may be limited to transmit up to only $$\left\lfloor \frac{n_c}{n_T} \right\rfloor \text{ or } \left\lfloor \frac{n_c}{n_T} \right\rfloor + 1$$

sub-carriers.

In order to simplify subsequent discussion, it is assumed that $n_c$ is divisible by $n_T$. It can be seen that the second implementation may be easily extended to the case where $n_c$ is not divisible by $n_T$ as well.

In the illustration of the second implementation shown in FIG. 9, two transmit antennas and eight sub-carriers are used.

The second implementation may be carried according to the following steps.

The first step is similar to the one used in the first implementation, where $j_{best}^{(i,k)}$ is first obtained according to equation (20). The selected sub-carriers for each antenna are as shown in the matrix 901 of FIG. 9.

The second step involves initializing the maximum number of sub-carriers allocated for each antenna, $n_k^{max}$, where $$n_k^{max} = \frac{n_c}{n_T}.$$

Next, the $n_k^{max}$ sub-carriers with the highest quality in the transmission characteristic among the selected $j_{best}^{(i,k)}$ sub-carriers are selected for each column, i.e., each antenna. The remaining selected sub-carriers (namely, sub-carriers 2 and 3) are then reset to zero, as shown in the matrix 903 of FIG. 9.

In this context, if the number of selected sub-carriers $j_{best}^{(i,k)}$ is less than $n_k^{max}$, then all the selected sub-carriers $j_{best}^{(i,k)}$ for that column will be chosen (which is the case for antenna 2 as shown in FIG. 9).

The remaining number of sub-carriers allocated for each antenna may then be updated according to the equation $n_k^{max}(s+1) = n_k^{max}(s) - n_k^{selected}(s)$ where s is the step index.

In the third step, a new sub-carriers allocation for the remaining sub-carriers may be obtained for each antenna. For example, this may be achieved by repeating the first step among the remaining sub-carriers.

Next, the value $n_k^{max}$ for each antenna may then be updated accordingly.

The third step may then be carried out repeatedly until $n_k^{max}=0$ for all antennas (as shown in the matrix 905 of FIG. 9).

Finally, the first, second and third steps may be carried out for the $(i+1)^{th}$ sub-band, until all the sub-carriers in all sub-bands have been allocated.

FIG. 10 shows an illustration of the third implementation of the method of transmitting data to a receiver according to one embodiment of the invention.

This third implementation is similar to the second implementation of the method of transmitting data to a receiver, with the exception that the third implementation uses a simplified way to allocate the sub-carriers in order to achieve a reduced implementation complexity.

In more detail, this third implementation may select $n_k^{max}$ sub-carriers randomly, for example, instead of the first $n_k^{max}$ sub-carriers with the highest quality in the transmission characteristic, for example, in order to avoid the sorting operations used in the second implementation. As such, this leads to a simplified implementation and a reduced implementation complexity. However, this may result in a small performance loss.

In the illustration of the third implementation shown in FIG. 10, two transmit antennas and eight sub-carriers are used.

The third implementation may be carried according to the following steps.

The first step is similar to the one used in the second implementation, where $j_{best}^{(i,k)}$ is first obtained according to equation (20). The selected sub-carriers for each antenna are as shown in the matrix 1001 of FIG. 10.

The second step involves initializing the maximum number of sub-carriers allocated for each antenna $n_k^{max}$, where $$n_k^{max} = \frac{n_c}{n_T}.$$

Next, the $n_k^{max}$ sub-carriers among the selected $j_{best}^{(i,k)}$ sub-carriers are selected randomly, for example, for each column, i.e., each antenna. The remaining selected sub-carriers (namely, sub-carriers 2 and 6) are then reset to zero, as shown in the matrix 1003 of FIG. 10.

In this context, if the number of selected sub-carriers $j_{best}^{(i,k)}$ is less than $n_k^{max}$, then all the selected sub-carriers $j_{best}^{(i,k)}$ for that column will be chosen (which is the case for antenna 2 as shown in FIG. 10).

The remaining number of sub-carriers allocated for each antenna may then be updated according to the equation $n_k^{max}(s+1) = n_k^{max}(s) - n_k^{selected}(s)$, where s is the step index.

In the third step, a new sub-carriers allocation for the remaining sub-carriers may be obtained for each antenna. For example, this may be achieved by repeating the first step among the remaining sub-carriers.

Next, the value $n_k^{max}$ for each antenna may then be updated accordingly.

The third step may then be carried out repeatedly until $n_k^{max}=0$ for all antennas (as shown in the matrix 1005 of FIG. 10).

Finally, the first, second and third steps may be carried out for the $(i+1)^{th}$ sub-band, until all the sub-carriers in all sub-bands have been allocated.

As a side remark, it can be seen that the first step and the third step of this third implementation are identical to the first step and the third step of the second implementation, respectively.

Figure 11:
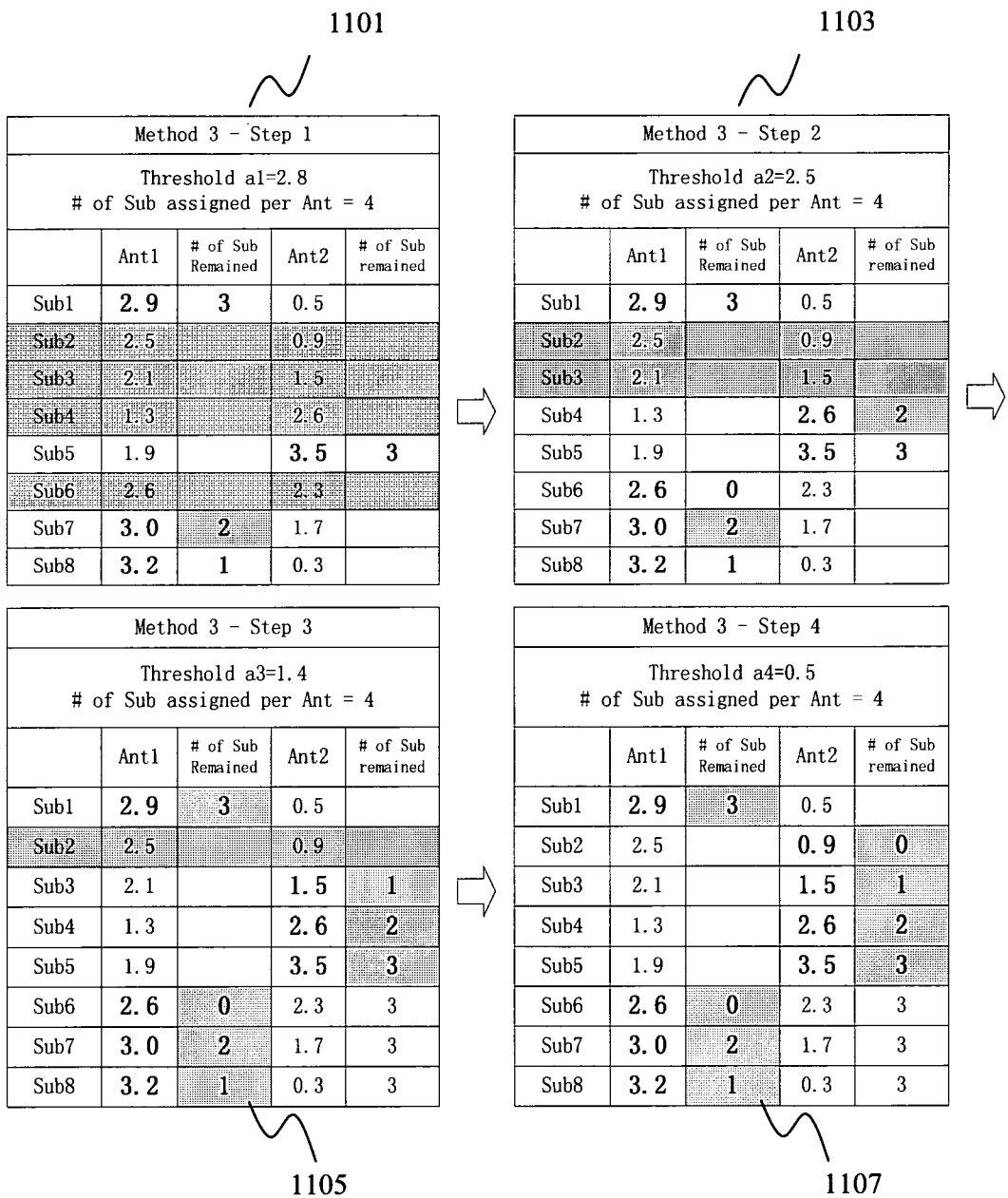
FIG. 11 shows an illustration of a fourth implementation of a method of transmitting data to a receiver according to one embodiment of the invention.

FIG. 11 shows an illustration of the fourth implementation of the method of transmitting data to a receiver according to one embodiment of the invention.

Compared to the second and the third implementations of the method of transmitting data to a receiver, this fourth implementation also provides a constraint on the number of sub-carriers which may be allocated to each antenna. This constraint allows the sub-carriers to be evenly distributed among the plurality of antennas, in order to balance the peak to average ratio (PAPR) value for the plurality of (transmit) antennas.

However, the approach of applying the constraint in this fourth implementation is carried out using a set of threshold values. By so doing, this fourth implementation avoids the use of the highly complex sorting operations of the second implementation and the performance loss as a result of the approach used in the third implementation. In this context, the use of the set of threshold values only requires the compare operation.

In the illustration of the third implementation shown in FIG. 10, two transmit antennas and eight sub-carriers are used.

The third implementation may be carried according to the following steps.

The first step involves determining a set of threshold values, $a_l$, $l=1, \ldots L$ where L is the total number of threshold values and $a_l > 0$. Next, $a_1$ and the value $n_k^{max}$ $$\left( \text{where } n_k^{max} = \frac{n_c}{n_T} \right)$$

may be initialized. Following which, $|H_k^{(i,j)}|^2$ may be compared to $a_1$ for each sub-carrier and the respective antenna.

If it is determined that $|H_k^{(i,j)}|^2 > a_1$, then the said sub-carrier and the respective antenna may selected and indicated in bold as shown in matrix 1101 of FIG. 11. Accordingly, $n_k^{max}$ may be updated according to the equation $$n_k^{max}(s+1) = n_k^{max}(s) - 1.$$

In the second step, the threshold value used may be changed to $a_2$, where $a_2 \leq a_1$. Next, $|H_k^{(i,j)}|^2$ may be compared to $a_2$, for the unselected sub-carriers and the respective antenna.

If it is determined that $|H_k^{(i,j)}|^2 > a_2$, then the corresponding sub-carrier and the respective antenna may be selected and indicated in bold as shown in matrix 1103 of FIG. 11. Accordingly, $n_k^{max}$ is updated according to the equation $$n_k^{max}(s+1) = n_k^{max}(s) - 1.$$

Following which, the second step is carried out for the remaining threshold values $a_l$, for all values of l until l=L.

In the illustration shown in FIG. 11, the number of threshold values selected is 4. The matrices after the processing using the third threshold value ($a_3=1.4$) and the fourth threshold value ($a_4=0.5$) are labeled as 1105 and 1107 respectively in FIG. 11.

It can be seen that the number of iterations carried out depends on the number of threshold values selected. As such, the performance as well as the efficiency of the fourth implementation depends on the number of threshold values selected.

Following which, the allocation of sub-carriers may be updated for each data packet, for example, based on the channel estimation carried out using the preambles of each data packet, for example.

Turning now to the transmission characteristic used in the method of transmitting data to a receiver, it is known that for a point to point time division duplexing (TDD) communication system (such as a UWB communication system, for example) the propagation channel of the forward link is the reciprocal of the propagation channel of the reverse link, provided the round-trip delay is shorter than the propagation channel's coherence time.

However, it is also known that this is not the case for the radio frequency (RF) transceivers, which may exhibit significant amplitude and phase mismatches between the forward and reverse links, as well as across multiple antennas. Since these mismatches essentially may compromise the estimation of the channel state information (CSI), they may result in a severe degradation in the performance of the embodiments of the method of transmitting data to a receiver.

In more detail, the effects of these mismatches are described as follows.

An ideal transceiver may be considered to have a baseband equivalent channel response of unit amplitude and of zero phase. Due to various random process variations, the actual channel response of the transceiver may exhibit a random channel response which may approximate the ideal frequency response. The magnitude of the exhibited deviation from the ideal channel response depends on the magnitude of the random process variations. In this context, the approximate ideal response may be referred to as a mismatch between the forward and reverse links.

Figure 12:
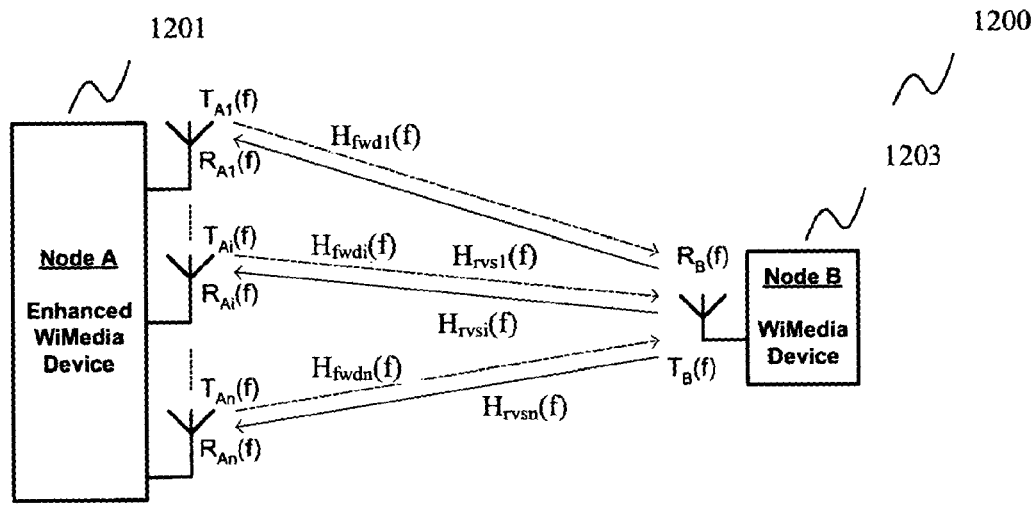
FIG. 12 shows a signal flow representation of the data transmission carried out in a communication system according to one embodiment of the invention, wherein node B has a receiving antenna.

FIG. 12 shows a signal flow representation of the data transmission carried out in the communication system 100 according to one embodiment of the invention.

Let T(f) represent the transmit frequency response function in the frequency domain and R(f) represent the receive frequency response function in frequency domain.

The mismatch in the transmit frequency response function may be expressed using the complex gains $T(f) = |T(f)| e^{j \, arg(T(f))}$, and likewise, the mismatch in the receive frequency response function may be expressed using complex gains $R(f) = |R(f)| e^{j \, arg(R(f))}$, where $|T(f)|$ and $|R(f)|$ are the respective amplitudes of the mismatches, and $e^{j \, arg(T(f))}$ and $e^{j \, arg(R(f))}$ are the respective phases of the mismatches.

As mentioned earlier, since the selection criterion for the method of transmitting data to a receiver may be based on the signal power of the channel state information (CSI), only the amplitude of the mismatch need to be considered.

In this context, the respective amplitudes |T(f)| and |R(f)| may be modeled as a real Gaussian variable. As such, the mean of the respective amplitudes may be expressed as a unit value (which is the value of the ideal frequency response discussed earlier), and the variance of the respective amplitudes may be denoted as $\sigma^2$.

In this context, it should be noted that the Gaussian variable model is commonly used to model radio frequency (RF) amplitude errors, and it is typically assumed that the variance $\sigma^2$ is small (up to 40%, for example) such that the occurrence of a negative realization is negligible.

In FIG. 12, the combined channel response $C_{fwd}(f)$ and $C_{rvs}(f)$ for the respective forward and reverse links, which include T(f), R(f) and the channel response H(f), may be defined as follows $$C_{fwd_k}(f,t) = T_{A_k}(f) H_{fwd_k}(f,t) R_B(f) \quad (22)$$

$$C_{rvs_k}(f,t) = T_B(f) H_{rvs_k}(f,t) R_{A_k}(f) \quad (23)$$

where $k=1, \ldots, N_T$ is the antenna index corresponding to the transmit antennas at node A. The terms $H_{fwd_k}(f,t)$ and $H_{rvs_k}(f,t)$ represent the respective forward and reverse link channel response function, which may be assumed to have the property of time invariant reciprocity, i.e., $H_{fwd_k}(f,t)=H_{rvs_k}(f,t)$ for $k=1, \ldots, N_T$.

In this context, the actual estimation carried out using the preambles is the combined channel response $C_{rvs}(f)$. However, $C_{fwd}(f)$ is the channel response which is used in determining the sub-carriers allocation in the embodiments of the method of transmitting data to a receiver.

As such, the relationship between $C_{rvs}(f)$ and $C_{fwd}(f)$ may be described as follows $$C_{fwd_k}(f,t) = \frac{T_{A_k}(f)}{R_{A_k}(f)} C_{rvs_k}(f) \frac{R_B(f)}{T_B(f)} \quad (24)$$

Accordingly, the sub-carrier allocation criterion may be rewritten as follows $$k_{best}^{(j)} = \underset{k \in [1,n_T]}{\mathrm{argmax}} |C_{fwd_k}^{(j)}|^2 = \underset{k \in [1,n_T]}{\mathrm{argmax}} \left| \frac{T_{A_k}^{(j)}}{R_{A_k}^{(j)}} C_{rvs_k}^{(j)} \frac{R_B^{(j)}}{T_B^{(j)}} \right|^2 \quad (25)$$

where $C_{fwd_k}^{(j)} = C_{fwd_k}(f_0+j\Delta f)$, $C_{rvs_k}^{(j)} = C_{rvs_k}(f_0+j\Delta f)$, $T_{A_k}^{(j)} = T_{A_k}(f_0+j\Delta f)$, $R_{A_k}^{(j)} = R_{A_k}(f_0+j\Delta f)$, $T_B^{(j)} = T_B(f_0+j\Delta f)$, and $R_B^{(j)} = R_B(f_0+j\Delta f)$ for $j=1, \ldots, n_c$.

Assuming that the respective frequency responses $T^{(j)}$ and $R^{(j)}$ remain unchanged across the sub-carriers, then all the respective calibration factors $T_{A_k}^{(j)}, R_{A_k}^{(j)}, T_B^{(j)}$ and $R_B^{(j)}$ may be considered as independent from the sub-carrier index j. Accordingly, Equation (25) may be further simplified as follows $$k_{best}^{(j)} = \underset{k \in [1,n_T]}{\mathrm{argmax}} \left\{ |C_{rvs_k}^{(j)}|^2 \left| \frac{T_{A_k}}{R_{A_k}} \frac{R_B}{T_B} \right|^2 \right\} \quad (26)$$

Figure 13:
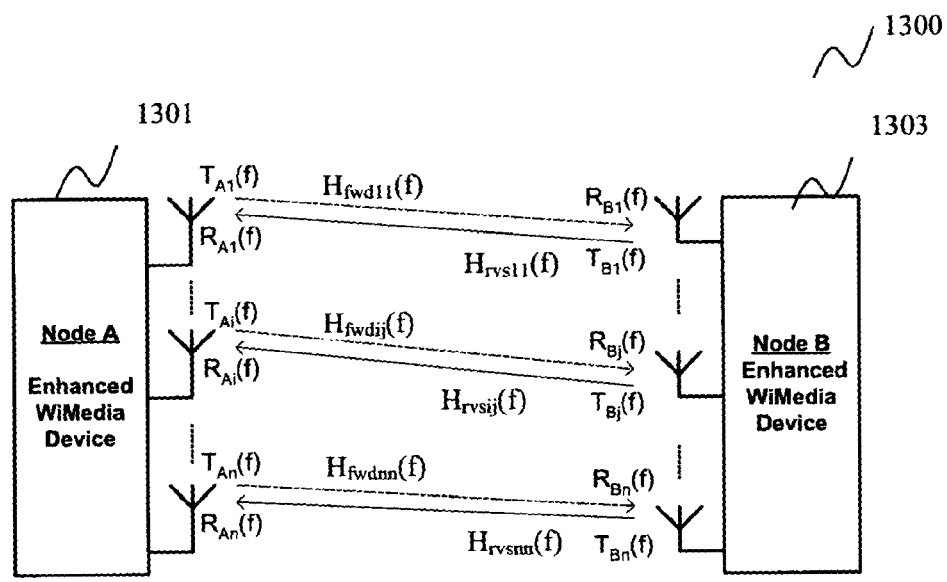
FIG. 13 shows a signal flow representation of the data transmission carried out in a communication system according to one embodiment of the invention, wherein a communication device receiving data (node B) uses a plurality of receiving antennas.

FIG. 13 shows a signal flow representation of the data transmission carried out in the communication system 100 according to another embodiment of the invention, wherein the receiving communication device (node B) comprises a plurality of receiving antennas.

Similarly to the case of FIG. 12, let T(f) represent the transmit frequency response function in the frequency domain and R(f) represent the receive frequency response function in frequency domain. Accordingly, |T(f)| and |R(f)| are the respective amplitudes of the mismatches.

The combined channel response $C_{fwd}(f)$ and $C_{rvs}(f)$ for the respective forward and reverse links, which include T(f), R(f) and the channel response H(f), may be defined as follows $$C_{fwd_{k,l}}(f,t) = T_{A_k}(f) H_{fwd_{k,l}}(f,t) R_{B_l}(f) \quad (27)$$

$$C_{rvs_{k,l}}(f,t) = T_{B_l}(f) H_{rvs_{k,l}}(f,t) R_{A_k}(f) \quad (28)$$

where $k=1, \ldots, N_T$ is the antenna index corresponding to the transmit antennas at node A. The terms $H_{fwd_{k,l}}(f,t)$ and $H_{rvs_{k,l}}(f,t)$ represent the respective forward and reverse link channel response function, which may be assumed to have the property of time invariant reciprocity, i.e., $H_{fwd_{k,l}}(f,t)=H_{rvs_{k,l}}(f,t)$ for $k=1, \ldots, N_T$, and $l=1, \ldots N_R$.

In this context, the actual estimation carried out using the preambles is the combined channel response $C_{rvs_{k,l}}(f)$. However, $C_{fwd_{k,l}}(f)$ is the combined channel response, which is used in determining the sub-carriers allocation in the embodiments of the method of transmitting data to a receiver.

As such, the relationship between $C_{rvs_{k,l}}(f)$ and $C_{fwd_{k,l}}(f)$ may be described as follows $$C_{fwd_{k,l}}(f,t) = \frac{T_{A_k}(f)}{R_{A_k}(f)} C_{rvs_{k,l}}(f) \frac{R_{B_l}(f)}{T_{B_l}(f)} \quad (29)$$

Accordingly, the sub-carrier allocation criterion may be rewritten as follows $$k_{best}^{(j)} = \underset{k \in [1,n_T]}{\mathrm{argmax}} \sum_{l=1}^{n_R} |C_{fwd_{k,l}}^{(j)}|^2 = \underset{k \in [1,n_T]}{\mathrm{argmax}} \sum_{l=1}^{n_R} \left| \frac{T_{A_k}^{(j)}}{R_{A_k}^{(j)}} C_{rvs_{k,l}}^{(j)} \frac{R_{B_l}^{(j)}}{T_{B_l}^{(j)}} \right|^2 \quad (30)$$

where $C_{fwd_{k,l}}^{(j)} = C_{fwd_{k,l}}(f_0+j\Delta f)$, $C_{rvs_{k,l}}^{(j)} = C_{rvs_{k,l}}(f_0+j\Delta f)$, $T_{A_k}^{(j)} = T_{A_k}(f_0+j\Delta f)$, $R_{A_k}^{(j)} = R_{A_k}(f_0+j\Delta f)$, $T_{B_l}^{(j)} = T_{B_l}(f_0+j\Delta f)$, and $R_{B_l}^{(j)} = R_{B_l}(f_0+j\Delta f)$ for $j=1, \ldots, n_c$.

Assuming that the respective frequency responses $T^{(j)}$ and $R^{(j)}$ remain unchanged across the sub-carriers, then all the respective calibration factors $T_{A_k}^{(j)}, R_{A_k}^{(j)}, T_{B_l}^{(j)}$ and $R_{B_l}^{(j)}$ may be considered as independent from the sub-carrier index j. Accordingly, Equation (30) may be further simplified as follows $$k_{best}^{(j)} = \underset{k \in [1,n_T]}{\mathrm{argmax}} \sum_{l=1}^{n_R} \left\{ \frac{|R_{B_l}|^2}{|T_{B_l}|^2} |C_{rvs_{k,l}}^{(j)}|^2 \frac{|T_{A_k}|^2}{|R_{A_k}|^2} \right\} \quad (31)$$

where the pre-calibration factor $|R_{B_l}|^2/|T_{B_l}|^2$ may need feedback from node B to node A using the reverse link.

In a further embodiment, a pre-scaling factor $f_{B_l}, l=1, \ldots, n_R$ at node B 1303 is utilized when transmitting channel estimation symbols in the reverse link, in order to avoid the hassle of doing pre-calibration factor feedback in the reverse link. Thus, equation (28) can be reformulated as $$C_{rvs_{k,l}}(f,t) = f_{B_l} T_B(f) H_{rvs_{k,l}}(f,t) R_{A_k}(f) \quad (32)$$

Let $f_{B_l}=|R_{B_l}|/|T_{B_l}|$, then the selection criteria can be rewritten as $$k_{best}^{(j)} = \operatorname*{argmax}_{k \in \{1, n_T\}} \sum_{l=1}^{n_R} \left\{ \frac{1}{|f_{B_l}|^2} \frac{|R_{B_l}|^2}{|T_{B_l}|^2} |C_{rvs_{k,l}}^{(j)}|^2 \frac{|T_{A_k}|^2}{|R_{A_k}|^2} \right\} \quad (33)$$

$$= \operatorname*{argmax}_{k \in \{1, n_T\}} \sum_{l=1}^{n_R} \left\{ |C_{rvs_{k,l}}^{(j)}|^2 \frac{|T_{A_k}|^2}{|R_{A_k}|^2} \right\}$$

Thus, the need to feedback the pre-calibration factor can be avoided.

It should be noted that the only difference of calibration factors between the case of FIG. 12

$$\left( \left| \frac{T_{A_k}}{R_{A_k}} \frac{R_B}{T_B} \right|^2 \right)$$

and case of FIG. 13

$$\left( \frac{|T_{A_k}|^2}{|R_{A_k}|^2} \right)$$

is the constant $|R_B/T_B|^2$, which is independent of index k (and l). Thus, such a difference will not affect the sub-carrier allocation, and the same pre-calibration method can apply for both the case of FIG. 12 and FIG. 13, wherein the receiver comprises either a receiving antenna or a plurality of receiving antennas.

In the following, a pre-calibration method is provided to obtain the calibration factor of $$\left| \frac{T_{A_k}}{R_{A_k}} \frac{R_B}{T_B} \right|^2$$

for the case illustrated in FIG. 12 for the $k^{th}$ transmitter at node A, as well as the calibration factor of $|T_{A_k}|^2/|R_{A_k}|^2$ for the case illustrated in FIG. 13 for the $k^{th}$ transmitter at node A or similarly the calibration factor of $|R_{B_l}|^2/|T_{B_l}|^2$ (the inverse of $|T_{B_l}|^2/|R_{B_l}|^2$) for the $l^{th}$ receiver at node B.

Figure 14:
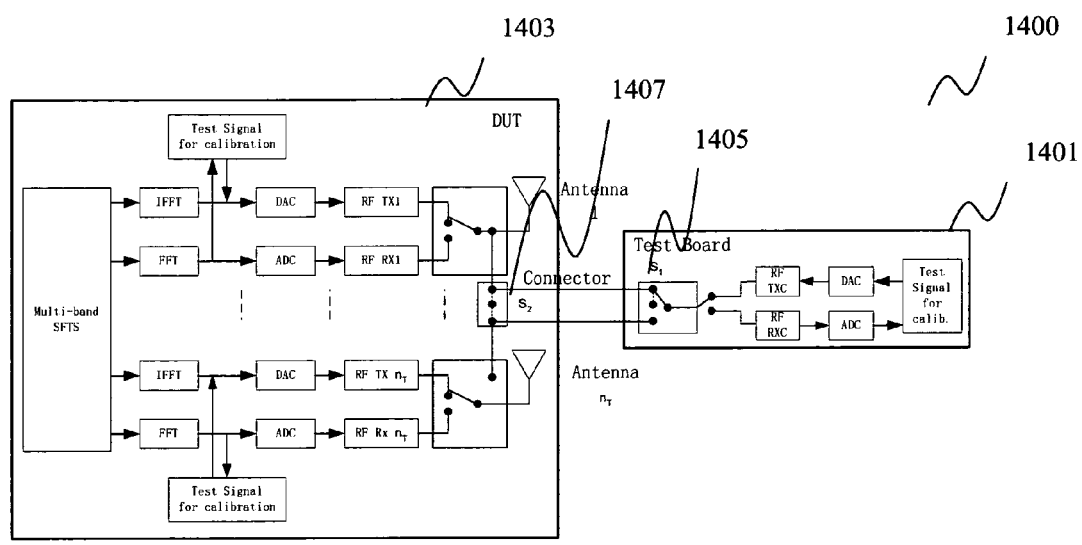
FIG. 14 shows a block diagram illustrating a first method for determining the calibration factors according to one embodiment of the invention.

FIG. 14 shows a block diagram illustrating a first method for determining the calibration factors according to one embodiment of the invention.

In this first method, a test board 1401 may be used to obtain the measurements for the calibration factor $$\left| \frac{T_{A_k}}{R_{A_k}} \frac{R_B}{T_B} \right|^2$$

from the different transmitters and receivers of the communication device 1403, using the setup shown in FIG. 14. As shown in FIG. 14, the test board 1401 may be a device external to the communication device 1403.

The switches $S_1$ 1405 and $S_2$ 1407 may form a calibration loop, and may be used to control the measurement sequence from Antenna 1 to Antenna $n_T$. A binary phase shift keying (BPSK) signal may be used as the test signal. Additionally, the channel estimation may be performed at the respective receivers on the test board 1001 and the communication device 1403, so that estimates of $T_{A_k}$ and $R_{A_k}$ may be obtained.

It can be seen that measurements of the $2n_T$ transfer functions α shown in Equation (34) may also be obtained. As the connections are made via the direct cable connection, the transmission loss due to the cable connection may be assumed to be a constant value $L_c$. The measurements obtained may then be expressed as $$\alpha_{1,1} = T_{A_1} L_c R_{B_t}$$

$$\alpha_{1,2} = T_{B_t} L_c R_{A_1}$$

$$\alpha_{n_T,1} = T_{A_{n_T}} L_c R_{B_t}$$

$$\alpha_{n_T,2} = T_{B_t} L_c R_{A_{n_T}} \quad (34)$$

where $T_{B_t}$ and $R_{B_t}$ denote the respective transmit and receive frequency responses for the communication device 1403. The calibration factor cf may then be defined as follows $$cf_1 = \frac{\alpha_{1,1}}{\alpha_{1,2}} = \frac{T_{A_1}}{R_{A_1}} \frac{R_{B_t}}{T_{B_t}} \quad (35)$$

$$\vdots$$

$$cf_{n_T} = \frac{\alpha_{n_T,1}}{\alpha_{n_T,2}} = \frac{T_{A_{n_T}}}{R_{A_{n_T}}} \frac{R_{B_t}}{T_{B_t}}$$

Therefore, the calibration factor matrix CF can be formed as follows $$CF = \begin{bmatrix} cf_1 & \cdots & 0 \\ \vdots & \ddots & \vdots \\ 0 & \cdots & cf_{n_T} \end{bmatrix} \quad (36)$$

It can be seen from Equation (36) that the calibration factor matrix CF is a diagonal matrix. As such, its values may be stored in the flash memory, for example, and then loaded during an initial setup. In this context, the loading of the values for the calibration factor matrix CF may be referred to as a pre-calibration process.

Further, as the matrix CF is a diagonal matrix, only $n_T$ values may be stored. As such, no additional of built-in calibration circuitry may be needed for the communication device 1403.

Accordingly, in the case as illustrated in FIG. 12 wherein the receiver comprises one receiving antenna, Equation (26) may be rewritten as $$k_{best}^{(j)} = \operatorname*{argmax}_{k \in \{1, n_T\}} \left\{ |C_{rvs_k}^{(j)}|^2 \times |cf_k \times const|^2 \right\} \quad (37)$$

where $$const = \frac{R_B}{T_B} \times \frac{T_{B_t}}{R_{B_t}}$$

is a constant which is independent of k, and as such, may not affect the process of allocating the sub-carriers.

Similarly, in the case as illustrated in FIG. 13 wherein the receiver comprises a plurality of receiving antennas, Equation (33) may be rewritten as $$k_{best}^{(j)} = \underset{k \in [1,n_T]}{\mathrm{argmax}} \sum_{l=1}^{n_R} \left\{ \left| C_{rvs_{k,l}}^{(j)} \right|^2 \times |cf_k \times const|^2 \right\} \quad (38)$$

where $const = T_{B_l}/R_{B_l}$ is a constant which is independent of k and l, hence it will not affect the subcarrier allocation.

Figure 15:
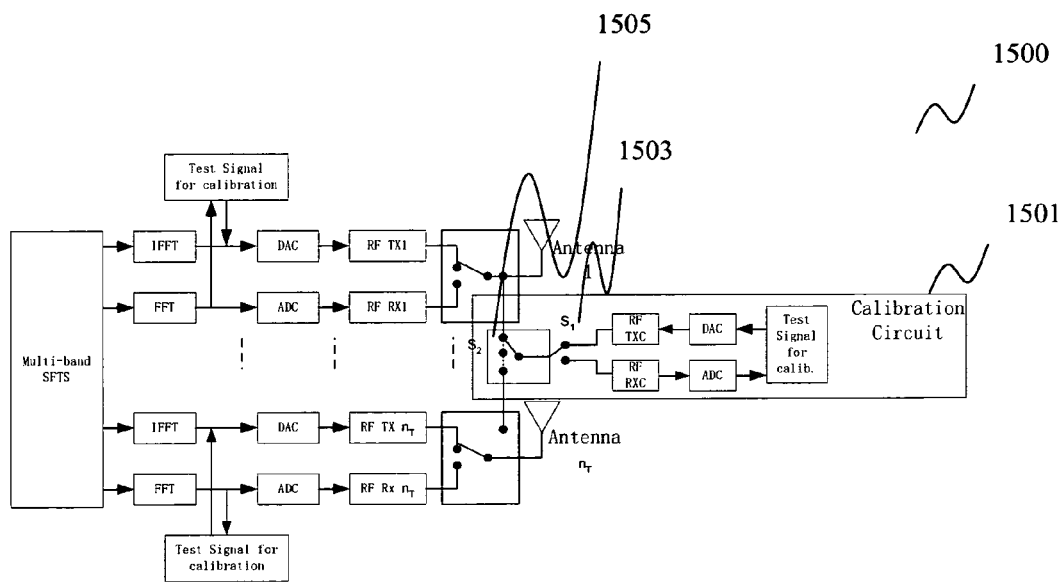
FIG. 15 shows a block diagram illustrating a second method for determining the calibration factors according to one embodiment of the invention.

FIG. 15 shows a block diagram illustrating a second method for determining the calibration factors according to one embodiment of the invention.

In this second method, an additional calibration circuit 1501 may be used to obtain the measurements for the calibration factor from the different transmitters and receivers of the communication device 1500, using the setup shown in FIG. 15. As shown in FIG. 15, the additional calibration circuit 1501 may be part of the communication device 1500.

The switches $S_1$ 1503 and $S_2$ 1505 form a calibration loop during the initial setup, which may be used to obtain the measurements for calibration factors from the different transmitters and receivers of the communication device 1500.

Based on the measurements obtained, the calibration factor matrix CF may be formed according to equations (34) and (35). Following which, the calibration factors may be used for the compensation of the mismatch for the embodiments of the method of transmitting data to a receiver. Further, as these calibration factors may be obtained using the built-in additional calibration circuit 1501 during the initial setup, these values may not be updated regularly.

In this context, it can be seen that the calibration factors (or the calibration factor matrix) may be used in view that the channel state information is estimated using measurements from the reverse link (instead of the forward link). However, the channel state information may also be estimated using measurements from the forward link as discussed in the following.

In one embodiment, the forward link channel frequency response for each antenna (of the transmitter) may be estimated by arranging the transmission of channel estimation (CE) symbols (such as preamble symbols, for example) for each antenna at the transmitter, one at a time, and then performing the channel estimation for each transmit antenna at the receiver side. In another embodiment, the forward link channel frequency response for each antenna (of the transmitter) may be estimated by transmitting orthogonal channel estimation symbol sequences for different transmit antennas at the same time, then performing the channel estimation jointly for all the transmit antennas at the receiver side.

Following this, the estimated channel state information for the respective forward link frequency responses for each transmit antenna may be transmitted back from the receiver side to the transmitter side, for example, using the feedback channel. The received estimated channel state information may then be used in the selection of antennas for sub-carriers.

However, it should be noted that the transmission of the estimated channel state information (frequency response) from the receiver side to the transmitter side may involve considerable transmission overhead for the feedback channel. As such, it may be preferable to implement the antenna selection process directly at the receiver side instead, and then transmit the antenna selection decision information for each sub-carrier via the feedback channel. Using this approach, only 1 bit may be required for each sub-carrier in the case where two transmit antennas are used, and only 2 bits may be required for each sub-carrier in the case where four transmit antennas are used, and so on.

In the embodiments discussed above, where the estimation of the channel state information is performed using measurements from the forward link, in order to perform the above discussed steps at the receiver side, hardware and/or software changes may be required. This may lead to an incompatibility with existing communication devices (i.e., the said receiver may not be WiMedia compliant, for example).

Figure 16:
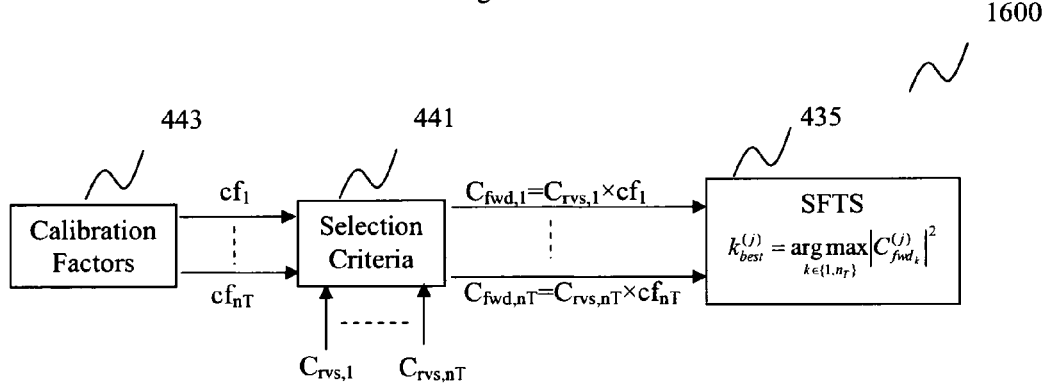
FIG. 16 shows an illustration of how the compensation of mismatches in the process of antenna and sub-carrier selection may be carried out based on the calibration factors and the estimated channel state information according to one embodiment of the invention, wherein the receiver has one receiving antenna.

FIG. 16 shows an illustration of how the compensation of mismatches in the process of antenna and sub-carrier selection may be carried out based on the calibration factors and the estimated channel state information (e.g. the combined channel response in the reverse link) according to one embodiment of the invention, wherein the receiver comprises one receiving antenna.

In the selection criteria unit 441 of FIG. 16 (also shown in FIG. 4), a compensated estimation of the combined channel response $C_{fwd}$ in the forward link is carried out by multiplying the calibration factor $c_f$ of an antenna with the respective combined channel response $C_{rvs}$ in the reverse link. The combined channel responses ($C_{rvs,\,1}$ to $C_{rvs,\,nT}$) in the reverse link are provided by parameter estimation units 421 (also shown in FIG. 4). The calibration factors are provided by calibration units 443 (also shown in FIG. 4). The obtained compensated estimation of the combined channel responses $C_{fwd}$ using equation (24) in the forward link corresponding to different transmitter antennas are then transmitted to the SFTS unit 435 for carrying out the selection of a best antenna using equation (25).

As shown in FIG. 16, the best antenna may be selected for each sub-carrier or the best set of sub-carriers may be allocated for each antenna using the improved selection criterion based on the estimated channel state information (CSI) and the calibration factors.

Figure 17:
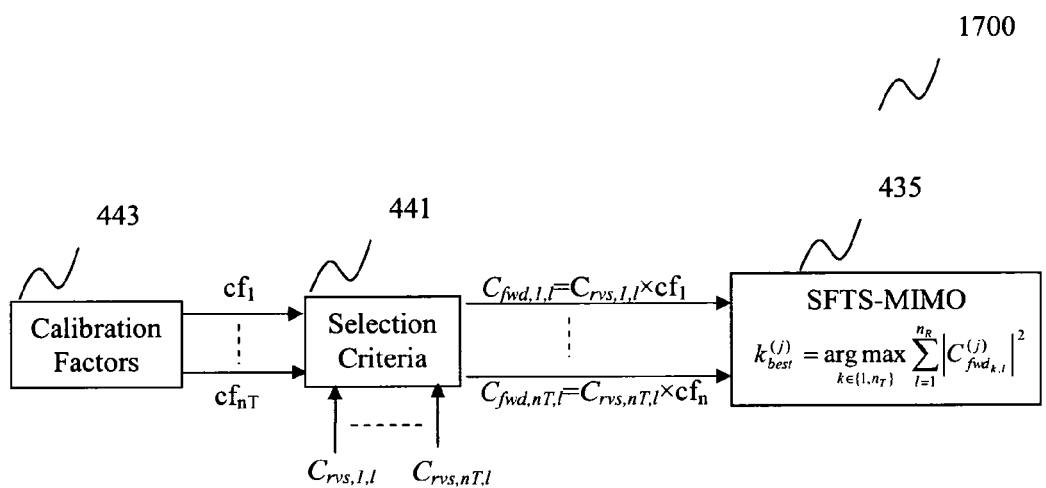
FIG. 17 shows a flow diagram of how the compensation of mismatches in the process of antenna and sub-carrier selection may be carried out at the transmitter side according to one embodiment of the invention, wherein the receiver has a plurality of receiving antennas.

Similarly, FIG. 17 shows an illustration of how the compensation of mismatches in the process of antenna and sub-carrier selection may be carried out at the transmitter side based on the calibration factors and the estimated channel state information according to one embodiment of the invention, wherein the receiver comprises a plurality of receiving antennas.

In the selection criteria unit 441 of FIG. 17 (also shown in FIG. 4), a compensated estimation of the combined channel response $C_{fwd}$ in the forward link is carried out by multiplying the calibration factor $c_f$ of an antenna with the respective combined channel response $C_{rvs}$ in the reverse link. The combined channel responses ($C_{rvs,\,1,l}$ to $C_{rvs,\,nT,l}$) in the reverse link are provided by parameter estimation units 421 (also shown in FIG. 4). The calibration factors are provided by calibration units 443 (also shown in FIG. 4). The obtained compensated estimation of the combined channel responses $C_{fwd}$ using equation (29) in the forward link corresponding to different transmitter antennas are then transmitted to the SFTS unit 435 for carrying out the selection of a best antenna using equation (30).

Figure 18:
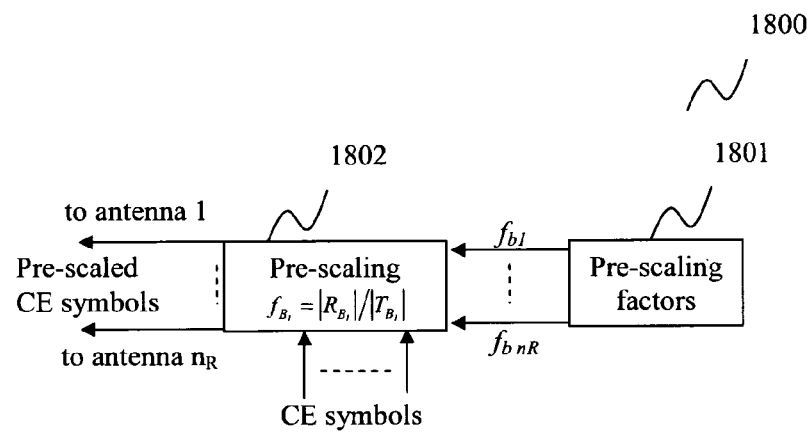
FIG. 18 shows a flow diagram of how part of the compensation of mismatches in the process of antenna and sub-carrier selection may be carried out at the receiver side according to one embodiment of the invention, wherein the receiver has a plurality of receiving antennas.

FIG. 18 shows an illustration of how the compensation of mismatches in the process of antenna and sub-carrier selection may be carried out at the receiver side utilizing pre-scaling factors for the transmission characteristic of the transmission in the reverse link, wherein the receiver comprises a plurality of receiving antennas.

Expression for pre-scaling factors has been given earlier in the description as $f_{B_l} = |R_{B_l}|/|T_{B_l}|$, for example. As shown in FIG. 18, a pre-scaling factor is applied to the channel estimation (CE) symbols, which is also shown in equation (32). CE symbols refer to the transmitted pilot symbols that will be used to estimate the channel state information or channel frequency response. As such, in a later stage, the need of the feedback of calibration factors from the receiver to the transmitter can be avoided as illustrated in equation (33). The pre-scaling factors can be easily obtained from the pre-calibration process. The total transmission power for the estimated transmission characteristic of the transmission from multiple antennas such as at node B 303, 1303 may be normalized to comply with FCC spectrum constraint for UWB.

Next, possible design modifications to the existing preamble structure and the effects of such modifications on the performance of the embodiments of the method of transmitting data to a receiver are discussed.

In each preamble OFDM symbol, the allocation of sub-carriers for each antenna may follow the same characteristic as the data portion described earlier. Based on the equivalent frequency selective channel $H_o(f)$ defined in Equation (8), the preamble OFDM symbol transmission for the embodiments of the method of transmitting data to a receiver may be used for automatic gain control (AGC), synchronization and channel estimation, for example, without any modification.

Since the equivalent frequency selective channel $H_o(f)$ may be expected to exhibit a flattened spectrum as compared to a conventional multi-band OFDM channel, less signal distortion and improved robustness for automatic gain control (AGC), synchronization and channel estimation may be expected, for example. This may further reduce the probability of noise amplification when a simple channel inversion is applied to channel equalization, for example.

Next, the Packet Error Rate (PER) performance results for the embodiments of the method of transmitting data to a receiver, are obtained using simulations. The performance results obtained are then compared to those of the standard WiMedia Ver1.0 communication devices. In this context, the IEEE 802.15.3a UWB indoor channel models [1] have been used in the simulations. For the case of using the proposed Multi-band SFTS system, channel realizations corresponding to multiple antennas are generated where assuming properly spaced antennas with uncorrelated multipath fading and correlated shadowing. There are four types of channel model listed in table 1900 shown in FIG. 19.

Figures 19, 20:
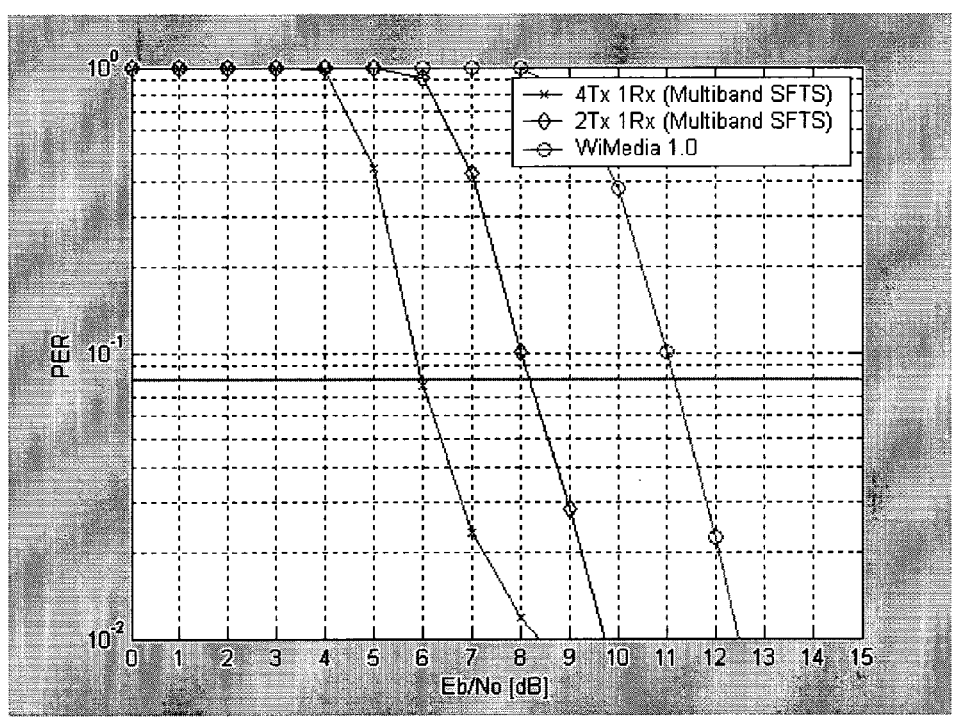
FIG. 19 shows a table describing the channel models used in the simulations carried out on embodiments of the invention.
FIG. 20 shows the packet error rate (PER) performance results for the data transmission rate of 480 Mbps in CM3 (4-10 m) for a communication device with and without using one embodiment of the invention.

FIG. 19 shows a table 1900 describing the channel models used in the simulations carried out on embodiments of the invention.

For example, the first channel model, CM1, represents a transmission channel where the transmission range is from about 0 m to about 4 m. Further, line of sight (LOS) is assumed between the communication devices which may be transmitting on the said transmission channel. Additionally, a maximum transmission delay of 8.92 ms is assumed in the said transmission channel.

Additionally, for the embodiments of the method of transmitting data to a receiver, three different channel realizations corresponding to multiple antennas are generated, namely, Case A: Independent fading channel without shadowing
Case B: Independent fading channel with independent shadowing
Case C: Independent fading channel with correlated shadowing The channel realization of Case A corresponds to the case where properly spaced antennas with uncorrelated multipath fading are assumed. The channel realization of Case B corresponds to an ideal case where properly spaced antennas with uncorrelated multipath fading and uncorrelated shadowing are assumed. The channel realization of Case C corresponds to the case where properly spaced antennas with uncorrelated multipath fading and correlated shadowing are assumed. Further, the distribution of the channel model for Case C is aligned to the measurement results [2].

Figure 21:
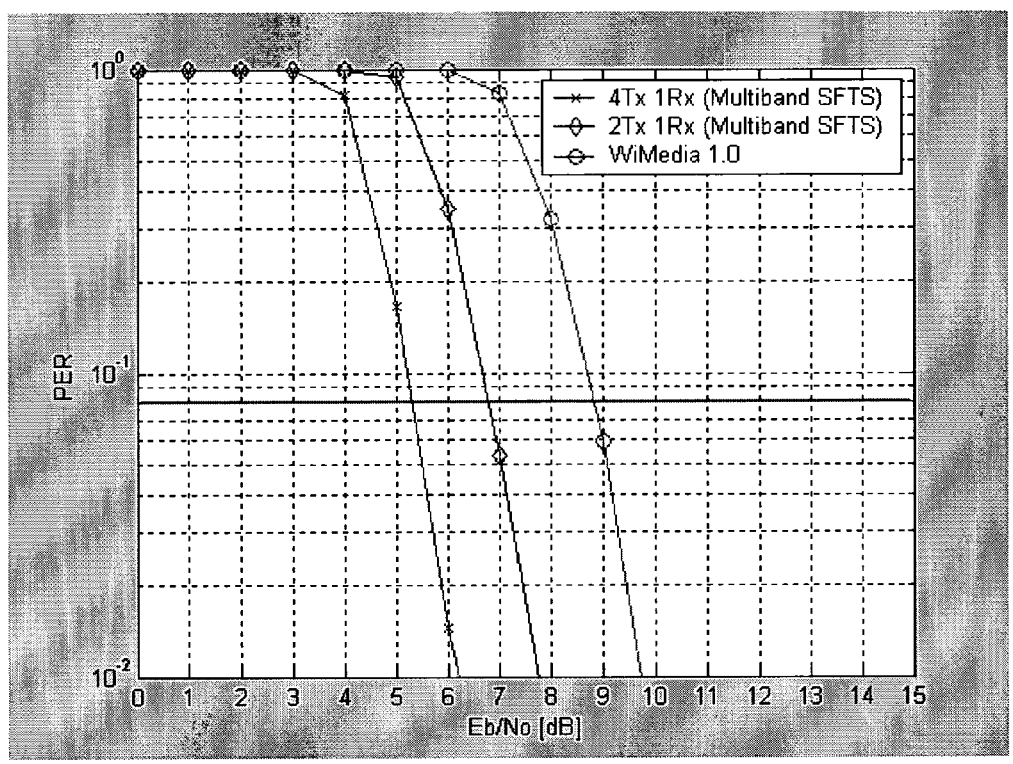
FIG. 21 shows the packet error rate (PER) performance results for the data transmission rate of 200 Mbps in CM3 (4-10 m) for a communication device with and without using one embodiment of the invention.
Figure 22:
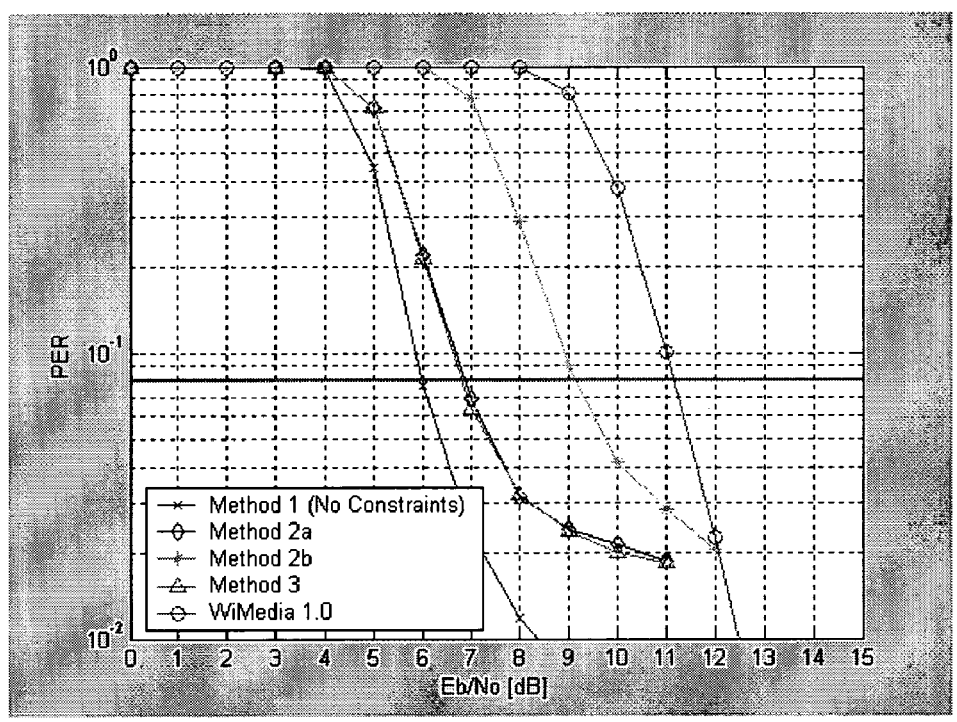
FIG. 22 shows the packet error rate (PER) performance results for the data transmission rate of 480 Mbps in CM3 (4-10 m) for a communication device with and without using one embodiment of the invention.

In this context, it should be noted that the performance results shown in FIGS. 20 to 22 are based on the channel realization of Case A.

FIG. 20 shows the packet error rate (PER) performance results for the data transmission rate of 480 Mbps in CM3 (4-10 m) for a communication device with and without using one embodiment of the invention.

It can be seen in FIG. 20 that a 5.2 dB gain may be achieved for a standard WiMedia 1.0 communication device by using an embodiment of the method of transmitting data to a receiver with four transmit antennas. Further, it can also be seen that a 3 dB gain may be achieved for a standard WiMedia 1.0 communication device by using an embodiment of the method of transmitting data to a receiver with two transmit antennas.

These performance gains show the effectiveness of the embodiments of the method of transmitting data to a receiver when used in high data rate transmissions. Additionally, it should be noted that channel coding with high code rates (such ask $R_c=\sqrt[3]{4}$, for example) which may be used by a standard WiMedia 1.0 communication device tend to be less effective in high data rate transmissions.

FIG. 21 shows the packet error rate (PER) performance results for the data transmission rate of 200 Mbps in CM3 (4-10 m) for a communication device with and without using one embodiment of the invention.

It can be seen in FIG. 21 that a 3.6 dB gain may be achieved for a standard WiMedia 1.0 communication device by using an embodiment of the method of transmitting data to a receiver with four transmit antennas. Further, it can also be seen that a 2 dB gain may be achieved for a standard WiMedia 1.0 communication device by using an embodiment of the method of transmitting data to a receiver with two transmit antennas.

In this case, it should be noted that part of the performance gain obtained by using the embodiments of the method of transmitting data to a receiver has been offset by the effective channel coding (such as $R_c=\sqrt[5]{8}$, for example) used in a standard WiMedia 1.0 communication device.

FIG. 22 shows the packet error rate (PER) performance results for the data transmission rate of 480 Mbps in CM3 (4-10 m) for a communication device with and without using one embodiment of the invention.

In more detail, a performance comparison of the first implementation (labeled as Method 1), the second implementation (labeled as Method 2a), the third implementation (labeled as Method 2b) and the fourth implementation (labeled as Method 3) is shown in FIG. 22.

It can be seen in FIG. 22 that the first implementation (Method 1) shows the best performance among all the implementations. It can also be seen that the second implementation (Method 2a) shows a comparable performance with the fourth implementation (Method 3).

When compared to the performance results of the first implementation (Method 1), the degradation in performance as a result of using the constraint on the maximum number of sub-carriers allocated for each antenna in the second implementation (Method 2a) and in the fourth implementation (Method 3) is only less than 1 dB. However, the degradation in performance in the third implementation (Method 2b) is significant as a result of using the random selection in order to achieve an implementation with lower complexity.

Overall, it can be seen from the performance results shown in FIG. 22 that the first implementation (Method 1) provides the best choice for the selection criteria.

Figure 23:
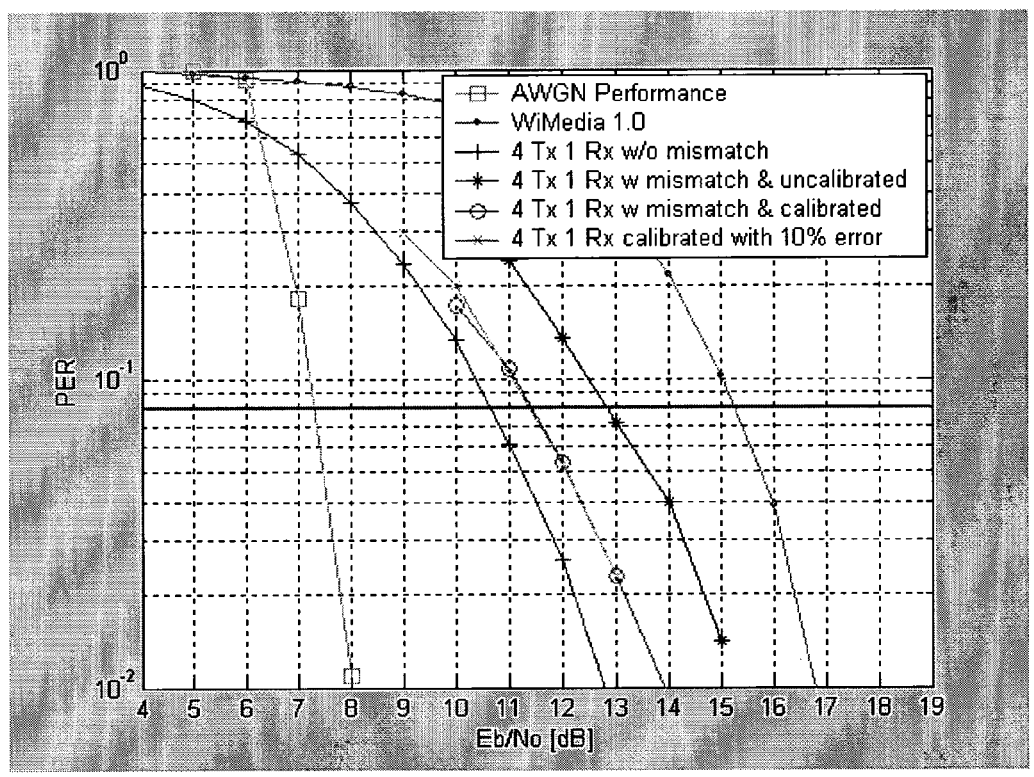
FIG. 23 shows the packet error rate (PER) performance results for the data transmission rate of 480 Mbps for a communication device with and without using one embodiment of the invention.
Figure 24:
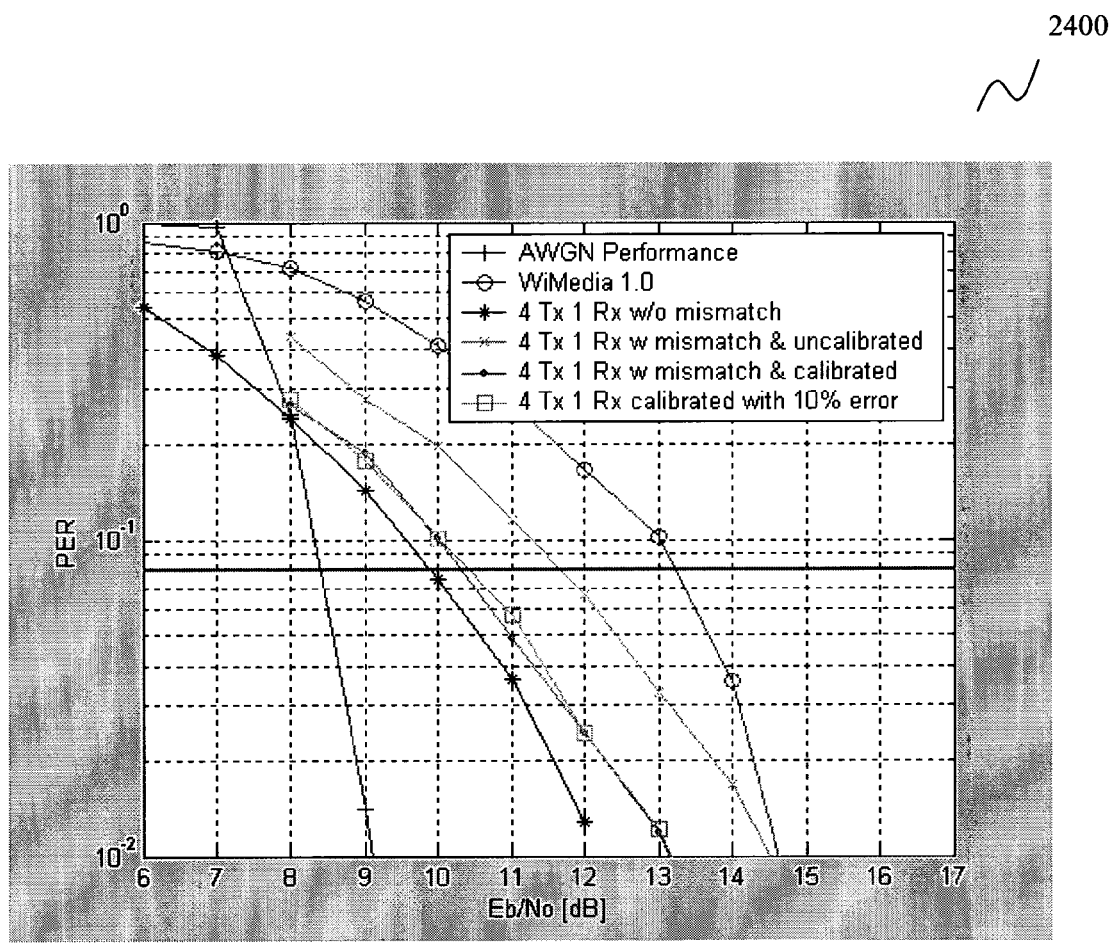
FIG. 24 shows the packet error rate (PER) performance results for the data transmission rate of 200 Mbps for a communication device with and without using one embodiment of the invention.

As a side remark, it should be noted that the performance results shown in FIGS. 23 and 24 are based on the channel realization of Case C.

FIG. 23 shows the packet error rate (PER) performance results for the data transmission rate of 480 Mbps for a communication device with and without using one embodiment of the invention.

In more detail, a performance comparison of the various implementations with and without the calibration process is shown in FIG. 23.

It can be seen in FIG. 23 that a 4.6 dB gain may be achieved for a standard WiMedia 1.0 communication device by using an embodiment of the method of transmitting data to a receiver with four transmit antennas. Further, it can be seen that the performance degradation due to mismatch is only about 2 dB when calibration is not carried out, but the performance degradation is reduced to only 0.5 dB when calibration is carried out.

Additionally, it is noted that the performance degradation may be negligible when the measured calibration factors have only about 10% error.

It can be seen that the overall performance gain achieved for a standard WiMedia 1.0 communication device by using embodiment of the method of transmitting data to a receiver with calibration to compensate for the mismatch is about 4 dB.

FIG. 24 shows the packet error rate (PER) performance results for the data transmission rate of 200 Mbps for a communication device with and without using one embodiment of the invention.

Similar to FIG. 23, a performance comparison of the various implementations with and without the calibration process is also shown in FIG. 24.

It can be seen in FIG. 24 that a 3.3 dB gain may be achieved for a standard WiMedia 1.0 communication device by using an embodiment of the method of transmitting data to a receiver with four transmit antennas. Further, it can be seen that the performance degradation due to mismatch is only about 1.6 dB when calibration is not carried out, but the performance degradation is reduced to only 0.4 dB when calibration is carried out.

Additionally, it is also noted that the performance degradation may be negligible when the measured calibration factors have only about 10% error.

It can be seen that the overall performance gain achieved for a standard WiMedia 1.0 communication device by using embodiment of the method of transmitting data to a receiver with calibration to compensate for the mismatch is about 2.9 dB.

Figure 25:
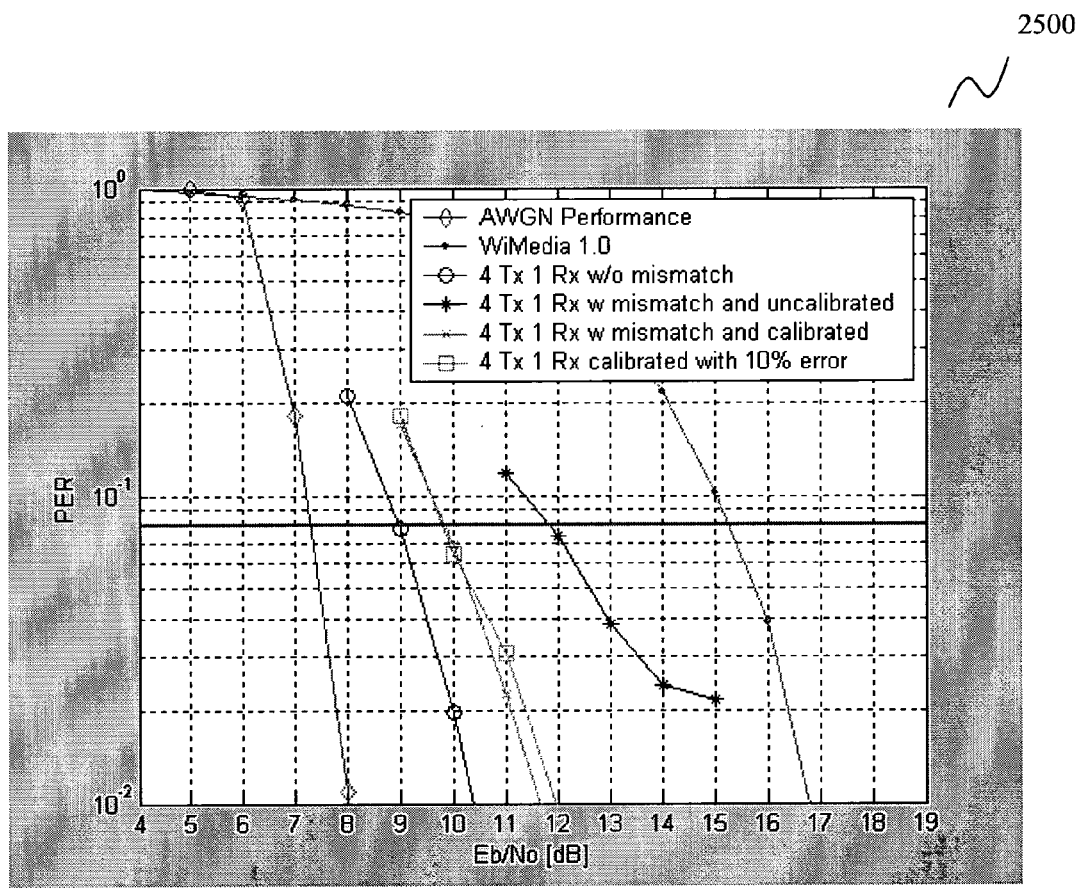
FIG. 25 shows the packet error rate (PER) performance results for the data transmission rate of 480 Mbps over the channel realization for Case B, for a communication device with and without using one embodiment of the invention.

FIG. 25 shows the packet error rate (PER) performance results for the data transmission rate of 480 Mbps over the channel realization for Case B, for a communication device with and without using one embodiment of the invention.

Similar to FIGS. 23 and 24, a performance comparison of the various implementations with and without the calibration process is also shown in FIG. 25.

It can be seen in FIG. 25 that a 6.2 dB gain may be achieved for a standard WiMedia 1.0 communication device by using an embodiment of the method of transmitting data to a receiver with four transmit antennas. In this context, when compared to FIG. 23, the larger performance gain achieved in FIG. 25 is primarily due to the independent shadowing channel. This means the upper bound of the performance gain achievable may even be higher when the embodiments of the method of transmitting data to a receiver are used.

Further, it can be seen that the performance degradation due to mismatch is only about 2.8 dB when calibration is not carried out, but the performance degradation is reduced to only 0.8 dB when calibration is carried out.

Additionally, it is also noted that the performance degradation may be negligible when the measured calibration factors have only about 10% error. It can be seen that the overall performance gain achieved for a standard WiMedia 1.0 communication device by using embodiment of the method of transmitting data to a receiver with calibration to compensate for the mismatch is about 5.4 dB.

Figure 26:
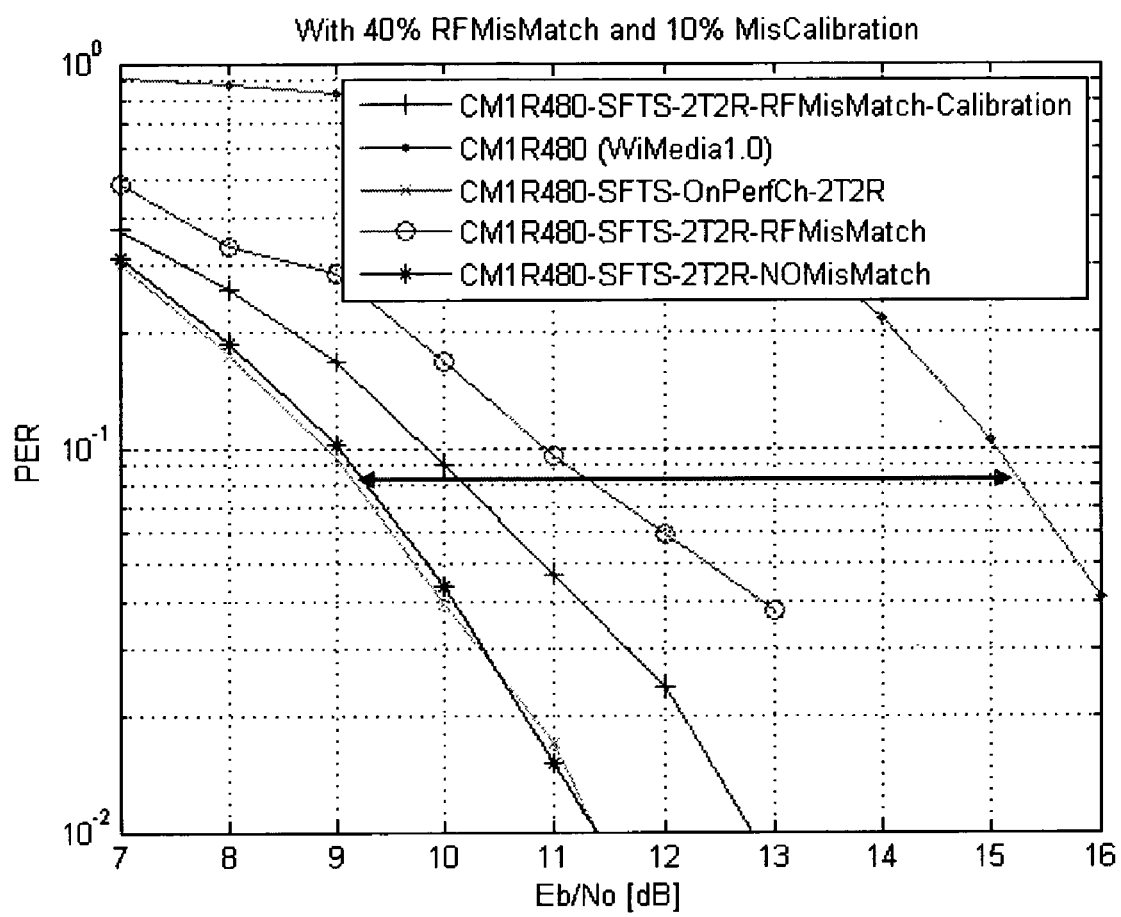
FIG. 26 shows the packet error rate (PER) performance results for the data transmission rate of 480 Mbps in CM1 for a communication system with and without using one embodiment of the invention.

FIG. 26 shows the packet error rate (PER) performance results for the data transmission rate of 480 Mbps in CM1 for a communication system with and without using one embodiment of the invention.

It can be seen that the effect on calibration for the mismatch among multiple transmit and receive front-end chain for the proposed Multi-band SFTS-MIMO (multiple-input multiple-output) communication system. It is observed that a 6 dB gain can be achieved by the proposed Multi-band SFTS-MIMO communication system with 2 transmit antennas and 2 receiving antennas as compared with the standard WiMedia 1.0 implementation. It is also noticed that channel estimation will cause only minimal degradation on the SFTS performance. Moreover, it is observed that the performance degradation due to RF mismatch is about 2 dB without any calibration. The performance degradation becomes less than 1 dB after the proposed pre-calibration where we assume that the measured calibration factors have 10% errors.

Therefore, the overall performance improvement due to the proposed Multi-band SFTS-MIMO communication system (2Tx, 2Rx) with pre-calibration for the mismatch is about 5 dB over the standard WiMedia 1.0.

Figure 27:
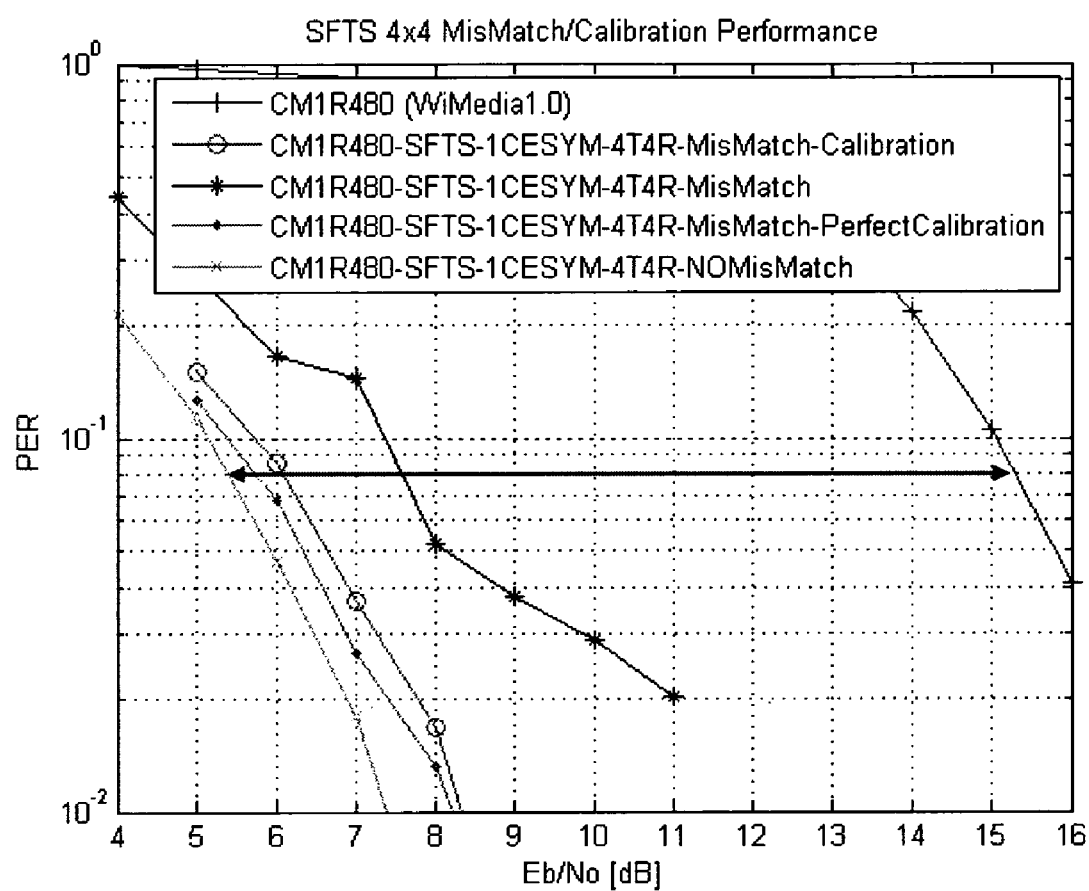
FIG. 27 shows the packet error rate (PER) performance results for the data transmission rate of 480 Mbps in CM1 for a communication system with and without using one embodiment of the invention.

FIG. 27 shows the packet error rate (PER) performance results for the proposed Multi-band SFTS-MIMO communication system for the data transmission rate of 480 Mbps for CM1 with and without using one embodiment of the invention.

It is observed that about 10 dB gain can be achieved by the proposed SFTS-MIMO communication system with 4 transmit antennas and 4 receiving antennas as compared with the standard WiMedia 1.0. It can be also seen that the performance degradation due to mismatch is more than 2 dB without any calibration. Similarly, the performance degradation becomes less than 1 dB after the proposed pre-calibration. It is noticed that the degradation is negligible when the measured calibration factors have 10% errors.

Therefore, the overall performance improvement due to the proposed Multi-band SFTS communication system with calibration for the mismatch is more than 9 dB over the standard WiMedia 1.0.

Figure 28:
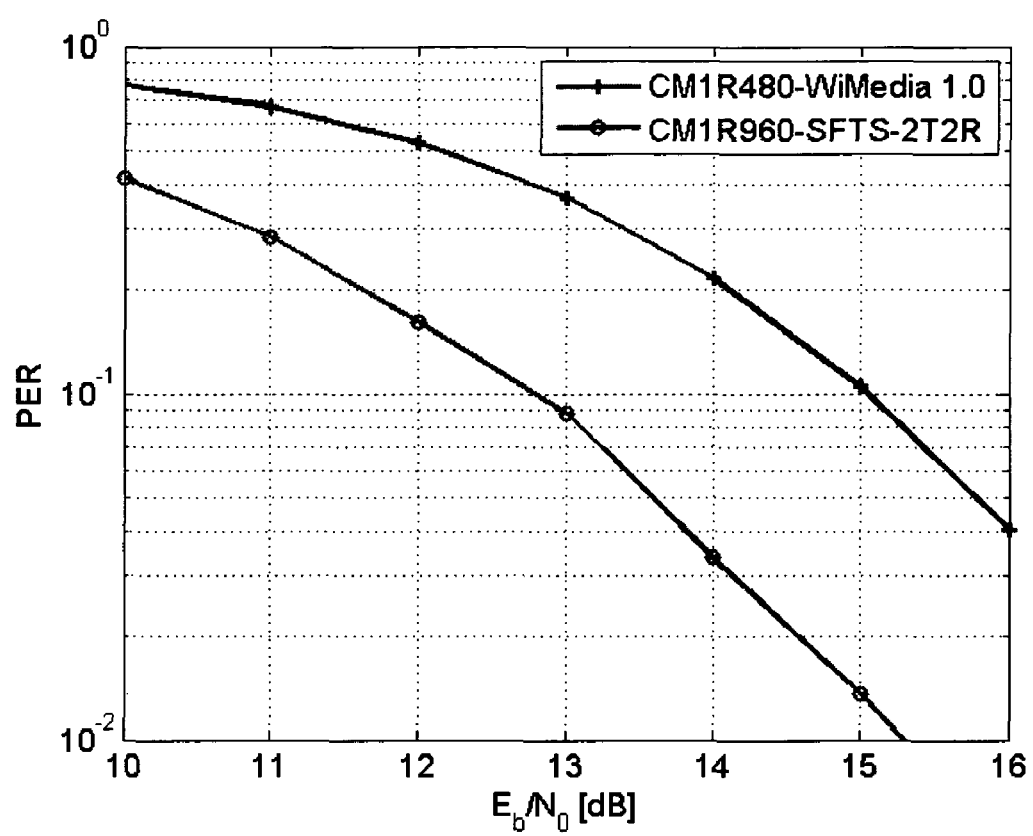
FIG. 28 shows the packet error rate (PER) comparison between the performance result of a data transmission rate of 960 Mbps in CM1 for a communication system with one embodiment of the invention, and the performance result of a data transmission rate of 480 Mbps without the embodiment of the invention.

FIG. 28 shows the packet error rate (PER) performance results for the proposed Multi-band SFTS-MIMO communication system with 2 transmit antennas and 2 receiving antennas at 960 Mbps by using 16-QAM.

It is observed that some performance gain can be achieved by the proposed SFTS-MIMO communication system with higher data rate as compared with the standard WiMedia 1.0.

Therefore, higher data throughput can be achieved by using the proposed Multi-band SFTS-MIMO communication system with higher order modulation such as 16-QAM (Quadrature amplitude modulation).

Embodiments of the invention may have the following effects.

Embodiments of the invention provide an elegant and low cost means to achieve full spatial and frequency diversity at both the transmitter and the receiver as well as the antenna array gain at the receiver, extension of the transmission range as well as enhanced robustness. Embodiments of invention also maintain its interoperability with present communication devices, and as such, may be applied to enhanced communication devices or next generation communication devices.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

In this document, the following publication is cited:

[1] J. Foerster, "Channel Modeling Sub-Committee Report Final," February 2003, http://grouper.ieee.org/groups/802/15/pub/.

[2] J. Kunisch and J. Pamp, "Measurement results and modeling aspects for the UWB radio channel," IEEE International Conference on UWB (UWBST 2002), Baltimore, May 2002.

What is claimed is;

1. A method of transmitting data to a receiver, wherein the data is transmitted using a plurality of sub-carriers, the method comprising
   receiving, by a transmitter, a signal from the receiver,
   determining, for each sub-carrier and for each of a plurality of combinations of the sub-carrier and an antenna of a plurality of antennas to be used for transmitting the data, a transmission characteristic of a transmission of the sub-carrier from the receiver to the antenna of the transmitter based on the received signal;
   compensating the difference between the properties of the transmission of the sub-carrier from the receiver to the antenna and the properties of the transmission of the sub-carrier from the antenna to the receiver to determine a transmission characteristic of a transmission of the sub-carrier from the antenna to the receiver based on the transmission characteristic of a transmission of the sub-carrier from the receiver to the antenna,
   selecting, for each sub-carrier, an antenna of the plurality of antennas to be used for the transmission of the sub-carrier based on the transmission characteristic of the transmission of the sub-carrier from the antenna to the receiver.

2. The method of claim 1,
   wherein the data to be transmitted using the plurality of sub-carriers is data of a communication channel of an upper communication layer.

3. The method of claim 1,
   wherein the antenna is selected based on a predetermined criterion with respect to the transmission characteristic.

4. The method of claim 3,
   wherein the predetermined criterion comprises the antennas being selected for the sub-carriers such that the antenna with the highest quality in the transmission characteristic is selected for each sub-carrier.

5. The method of claim 3,
   wherein the predetermined criterion comprises a maximum number of sub-carriers to be distributed to each antenna.

6. The method of claim 5,
   wherein the predetermined criterion further comprises the antennas are selected for the sub-carriers such that the antenna with the highest quality in the transmission characteristic is selected for each sub-carrier.

7. The method of claim 6,
   wherein the predetermined criterion further comprises the antennas are selected for the sub-carriers such that for each antenna, the number of sub-carriers for which the antenna has been selected is below or equals to the determined maximum number of sub-carriers.

8. The method of claim 1, wherein the receiver receives the transmitted data via one antenna or a plurality of antennas.

9. The method of claim 1, wherein the data is to be transmitted from the transmitter to the receiver and the selection is carried out by the transmitter.

10. The method of claim 1, wherein the data is to be transmitted from the transmitter to the receiver and the selection is carried out by the receiver.

11. The method of claim 10, wherein the receiver signals the selection to the transmitter.

12. The method of claim 1,
    wherein the transmission characteristic is information about a property of the communication channel used for transmitting the sub-carrier between the antenna and the receiver.

13. The method of claim 12,
    wherein the transmission characteristic is information about the quality of the communication channel.

14. The method of claim 13,
    wherein the transmission characteristic is a channel state information.

15. The method of claim 1,
    wherein the data is transmitted by modulation of the plurality of sub-carriers and transmitting the modulated sub-carriers using the antennas.

16. The method of claim 1,
    wherein the selection is carried out based on a comparison of the transmission characteristics of a transmission of the sub-carrier for different transmission antennas.

17. The method of claim 16,
    wherein for each sub-carrier of the plurality of sub-carriers an antenna of the plurality of antennas is selected to be used for transmitting the sub-carrier.

18. The method of claim 16,
    wherein the selection is carried out individually for each of the plurality of sub-carriers.

19. The method of claim 1, further comprising:
    determining the transmission characteristic of the sub-carrier from the receiver to the antenna;
    using a calibration factor to compensate the difference,
    wherein the calibration factor is determined as a function of a transmission characteristic of the antenna and a reception characteristic of the antenna.

20. The method of claim 19, further comprising:
    multiplying the calibration factor with the determined transmission characteristic of the sub-carrier from the receiver to the antenna to obtain a compensated transmission characteristic of the transmission and selecting the antenna based on the compensated transmission characteristic.

21. The method of claim 19, wherein the receiver comprises a plurality of antennas for receiving the transmitted data, and the calibration factor is determined as a function of a transmission characteristic of the receiving antennas and a reception characteristic of the receiving antennas.

22. The method of claim 21, wherein a pre-scaling factor is applied to channel estimation symbols at the receiver side, the channel estimation symbols being sent from the receiver to the transmitter, and being used to determine the transmission characteristic of the sub-carrier from the receiver to the antenna, such that the transmission characteristic of the sub-carrier from the receiver to the antenna is scaled with the pre-scaling factor, wherein the pre-scaling factor is reciprocal of the function of the transmission characteristic of the receiving antennas and the reception characteristic of the receiving antennas.

23. The method of claim 19, wherein each of the plurality of the antennas that are used for transmission of the sub-carriers has a respective calibration factor and all the calibration factors are stored in a memory.

24. A communication system for transmitting data, wherein the data is transmitted using a plurality of sub-carriers, the communication system comprising
  a receiver;
  a transmitter comprising
    a receiving unit configured to receive a signal from the receiver,
    a determining unit configured to determine, for each sub-carrier and for each of a plurality of combinations of the sub-carrier and an antenna of a plurality of antennas to be used by the for transmitting the data, a transmission characteristic of a transmission of the sub-carrier from the receiver to an antenna of the transmitter based on the received signal,
    a compensating unit configured to compensate the difference between the properties of the transmission of the sub-carrier from the receiver to the antenna and the properties of the transmission of the sub-carrier from the antenna to the receiver,
  a selection unit configured to determine, for each sub-carrier and for each of a plurality of combinations of the sub-carrier and an antenna of a plurality of antennas to be used for transmitting the data, a transmission characteristic of a transmission of the sub-carrier from the antenna to the receiver based on the transmission characteristic of a transmission of the sub-carrier from the receiver to the antenna, and to select, for each sub-carrier, an antenna of the plurality of antennas to be used for the transmission of the sub-carrier based on the transmission characteristic of the transmission of the sub-carrier from the antenna to the receiver.

25. The communication system of claim 24, wherein the receiver comprises one antenna or a plurality of antennas for receiving the transmitted data.

26. The communication system of claim 25, wherein a calibration factor is used by the compensating unit for compensating the difference, and wherein the calibration factor is a function of a transmission characteristic of the antenna and a reception characteristic of the antenna.

27. The communication system of claim 26, wherein the receiver comprises a plurality of antennas for receiving the transmitted data, the calibration factor is a function of a transmission characteristic of the receiving antennas and a reception characteristic of the receiving antennas.

28. The communication system of claim 27, wherein a pre-scaling factor is applied to channel estimation symbols at the receiver side, the channel estimation symbols being sent from the receiver to the transmitter, and being used to determine the transmission characteristic of the sub-carrier from the receiver to the antenna, such that the transmission characteristic of the sub-carrier from the receiver to the antenna is scaled with the pre-scaling factor, wherein the pre-scaling factor is reciprocal of the function of the transmission characteristic of the receiving antennas and the reception characteristic of the receiving antennas.

29. The communication system of claim 26, wherein the compensation is by multiplying the calibration factor with the transmission characteristic of the transmission of the sub-carrier from the receiver to the antenna.

30. The communication system of claim 26, wherein each of the plurality of antennas for the transmission of the sub-carries has a respective calibration factor.

31. The communication system of claim 30, further comprising a memory for storing calibration factors of all the antennas that are used for the transmission of the sub-carriers.

32. The communication system of claim 24, wherein the data is to be transmitted from the transmitter to the receiver and the selection is carried out by the transmitter.

33. The communication system of claim 24, wherein the data is to be transmitted from the transmitter to the receiver and the selection is carried out by the receiver.

34. The communication system of claim 33, wherein the receiver signals the selection to the transmitter.

35. The communication system of claim 24,
  wherein the communication system is an ad hoc radio communication system.

36. The communication system of claim 35,
  wherein the communication system is a WiMedia communication system.

37. The communication system of claim 35,
  wherein the communication system is a Bluetooth communication system.

38. The communication system of claim 35,
  wherein the communication system is a Firewire communication system.

39. The communication system of claim 35,
  wherein the communication system is a Certified Wireless Universal Serial Bus (USB) communication system.

40. A method of transmitting data to a receiver, wherein the data is transmitted using a plurality of sub-carriers for a multi-band Orthogonal Frequency-Division Multiplexing (OFDM) Ultra-Wideband (UWB) system, the method comprising
  receiving, by a transmitter, a signal from the receiver,
  determining, for each sub-carrier in each sub-band of a plurality of sub-bands and an antenna of a plurality of antennas to be used for transmitting the data, a transmission characteristic of a transmission of the sub-carrier from the receiver to the antenna of the transmitter based on the received signal;
  compensating the difference between the properties of the transmission of the sub-carrier from the receiver to the antenna and the properties of the transmission of the sub-carrier from the antenna to the receiver to determine a transmission characteristic of a transmission of the sub-carrier from the antenna to the receiver based on the transmission characteristic of a transmission of the sub-carrier from the receiver to the antenna,
  selecting, for each sub-carrier in each sub-band, an antenna of the plurality of antennas to be used for the transmission of the sub-carrier in each sub-band based on the transmission characteristic of the transmission of the sub-carrier from the antenna to the receiver.

41. The method of claim 40,
wherein the data to be transmitted using the plurality of sub-carriers is data of a communication channel of an upper communication layer.

42. The method of claim 40,
wherein the antenna is selected based on a predetermined criterion with respect to the transmission characteristic.

43. The method of claim 42,
wherein the predetermined criterion comprises the antennas being selected for the sub-carriers such that the antenna with the highest quality in the transmission characteristic is selected for each sub-carrier.

44. The method of claim 42,
wherein the predetermined criterion comprises a maximum number of sub-carriers to be distributed to each antenna.

45. The method of claim 44,
wherein the predetermined criterion further comprises the antennas are selected for the sub-carriers such that the antenna with the highest quality in the transmission characteristic is selected for each sub-carrier.

46. The method of claim 45,
wherein the predetermined criterion further comprises the antennas are selected for the sub-carriers such that for each antenna, the number of sub-carriers for which the antenna has been selected is below or equals to the determined maximum number of sub-carriers.

47. The method of claim 40, wherein the receiver receives the transmitted data via one antenna or a plurality of antennas.

48. The method of claim 40, wherein the data is to be transmitted from the transmitter to the receiver and the selection is carried out by the transmitter.

49. The method of claim 40, wherein the data is to be transmitted from the transmitter to the receiver and the selection is carried out by the receiver.

50. The method of claim 49, wherein the receiver signals the selection to the transmitter.

51. The method of claim 40,
wherein the transmission characteristic is information about a property of the communication channel used for transmitting the sub-carrier between the antenna and the receiver.

52. The method of claim 51,
wherein the transmission characteristic is information about the quality of the communication channel.

53. The method of claim 52,
wherein the transmission characteristic is a channel state information.

54. The method of claim 40,
wherein the data is transmitted by modulation of the plurality of sub-carriers and transmitting the modulated sub-carriers using the antennas.

55. The method of claim 40,
wherein the selection is carried out based on a comparison of the transmission characteristics of a transmission of the sub-carrier for different transmission antennas.

56. The method of claim 55,
wherein for each sub-carrier of the plurality of sub-carriers an antenna of the plurality of antennas is selected to be used for transmitting the sub-carrier.

57. The method of claim 55,
wherein the selection is carried out individually for each of the plurality of sub-carriers.

58. The method of claim 40, further comprising:
using a calibration factor to compensate the difference,
wherein the calibration factor is determined as a function of a transmission characteristic of the antenna and a reception characteristic of the antenna.

59. The method of claim 58, further comprising:
multiplying the calibration factor with the determined transmission characteristic of the sub-carrier from the receiver to the antenna to obtain a compensated transmission characteristic of the transmission and selecting the antenna based on the compensated transmission characteristic.

60. The method of claim 58, wherein the receiver comprises a plurality of antennas for receiving the transmitted data, and the calibration factor is determined as a function of a transmission characteristic of the receiving antennas and a reception characteristic of the receiving antennas.

61. The method of claim 60, wherein a pre-scaling factor is applied to channel estimation symbols at the receiver side, the channel estimation symbols being sent from the receiver to the transmitter, and being used to determine the transmission characteristic of the sub-carrier from the receiver to the antenna, such that the transmission characteristic of the sub-carrier from the receiver to the antenna is scaled with the pre-scaling factor, wherein the pre-scaling factor is reciprocal of the function of the transmission characteristic of the receiving antennas and the reception characteristic of the receiving antennas.

62. The method of claim 58, wherein each of the plurality of the antennas that are used for transmission of the sub-carriers has a respective calibration factor and all the calibration factors are stored in a memory.

63. A method of transmitting data to a receiver, wherein the data is transmitted using a plurality of sub-carriers, the method comprising
receiving, by the transmitter, a signal from the receiver,
determining, for each sub-carrier of the plurality of sub-carriers, a transmission characteristic of a transmission of the sub-carrier from the receiver to an antenna of the transmitter based on the received signal,
compensating the difference between the properties of a transmission of the sub-carrier from the receiver to the antenna and the properties of the transmission of the sub-carrier from the antenna to the receiver to determine a transmission characteristic of a transmission of the sub-carrier from the antenna to the receiver based on the transmission characteristic of a transmission of the sub-carrier from the receiver to the antenna,
selecting, for each sub-carrier, an antenna of a plurality of antennas to be used for the transmission of the sub-carrier based on the transmission characteristic of a transmission of the sub-carrier from the antenna to the receiver.

* * * * *